(12) United States Patent
Crothers et al.

(10) Patent No.: US 8,922,647 B2
(45) Date of Patent: Dec. 30, 2014

(54) PROJECTION AIDED FEATURE MEASUREMENT USING UNCALIBRATED CAMERA

(75) Inventors: Phillip J. Crothers, Hampton East (AU); Philip L. Freeman, Maryland Heights, MO (US); Martin A. Szarski, Glen Iris (AU); Justin G. Young, Box Hill North (AU)

(73) Assignee: The Boeing Company, Chicago, IL (US)

( * ) Notice: Subject to any disclaimer, the term of this patent is extended or adjusted under 35 U.S.C. 154(b) by 679 days.

(21) Appl. No.: 13/197,645

(22) Filed: Aug. 3, 2011

(65) Prior Publication Data
US 2013/0033596 A1 Feb. 7, 2013

(51) Int. Cl.
G06K 9/46 (2006.01)
G01B 11/00 (2006.01)
G01B 21/04 (2006.01)
G01B 11/02 (2006.01)
G01B 11/25 (2006.01)
H04N 7/18 (2006.01)

(52) U.S. Cl.
CPC ............ *G01B 11/002* (2013.01); *G01B 21/045* (2013.01); *G01B 11/02* (2013.01); *G01B 11/25* (2013.01)
USPC .......................................... 348/135; 382/206

(58) Field of Classification Search
USPC ....................................................... 348/135
See application file for complete search history.

(56) References Cited

U.S. PATENT DOCUMENTS

| 5,548,392 | A  | * | 8/1996  | Ogawa ............................ 356/3.13 |
| 5,661,667 | A  |   | 8/1997  | Rueb |
| 6,028,672 | A  | * | 2/2000  | Geng ............................... 356/602 |
| 6,100,984 | A  | * | 8/2000  | Chen et al. ....................... 356/601 |
| 7,117,047 | B1 | * | 10/2006 | Blake et al. ........................ 700/56 |
| 7,576,845 | B2 | * | 8/2009  | Asakura et al. ................... 356/73 |
| 7,701,592 | B2 |   | 4/2010  | St. Clair |
| 7,724,379 | B2 | * | 5/2010  | Kawasaki et al. .............. 356/603 |
| 7,783,376 | B2 |   | 8/2010  | Marsh |
| 8,085,388 | B2 | * | 12/2011 | Kaufman et al. ............. 356/5.01 |
| 2002/0186897 | A1 | * | 12/2002 | Kim et al. ........................ 382/288 |
| 2004/0133927 | A1 | * | 7/2004  | Sternberg et al. .............. 725/136 |

(Continued)

FOREIGN PATENT DOCUMENTS

DE  102006018766  10/2007
WO  WO2010052943  5/2010

OTHER PUBLICATIONS

Roger Y. Tsai, "A Versatile Camera Calibration Technique for High-Accuracy 3D Machine Vision Metrology Using Off-the-Shelf TV Cameras and Lenses," presented at the 1986 IEEE International Conference on Computer Vision and Pattern Recognition.

(Continued)

*Primary Examiner* — Sath V Perungavoor
*Assistant Examiner* — Howard D Brown, Jr.

(57) ABSTRACT

A method of measuring a feature of an article may include projecting a scale template onto the article at a predetermined size. The method may additionally include projecting a measurement pattern onto the article. An image containing the feature, the scale template, and the measurement pattern may be recorded by the camera. The method may further include determining a scale factor of the image based on the scale template, and determining a size and/or a location of the feature based upon the measurement pattern and the image scale factor.

20 Claims, 17 Drawing Sheets

(56) References Cited

U.S. PATENT DOCUMENTS

| | | | |
|---|---|---|---|
| 2005/0280803 A1 | 12/2005 | Slesinski et al. | |
| 2011/0221781 A1 | 9/2011 | Okamoto | |
| 2012/0154576 A1* | 6/2012 | Weston et al. | 348/136 |
| 2013/0100282 A1* | 4/2013 | Siercks | 348/135 |
| 2014/0015963 A1* | 1/2014 | Klaas | 348/136 |
| 2014/0071459 A1* | 3/2014 | Nakatsukasa | 356/611 |

OTHER PUBLICATIONS

Hexagon Metrology, "White Light Scanner Systems," retrieved May 20, 2011.
Sick, "3D Cameras" retrieved May 20, 2011.
Sick, "Smart Cameras," retrieved May 20, 2011.
Sick, "Nikon Metrology Laser Radar," retrieved May 20, 2011.
European Search Report for EP12177227 of Jun. 14, 2013.

* cited by examiner

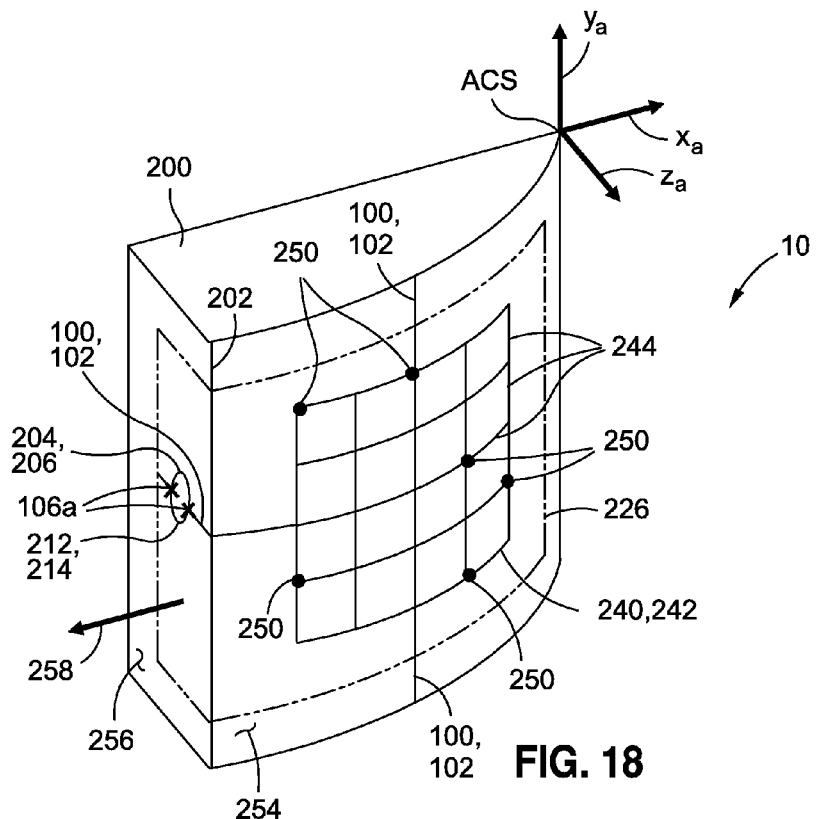
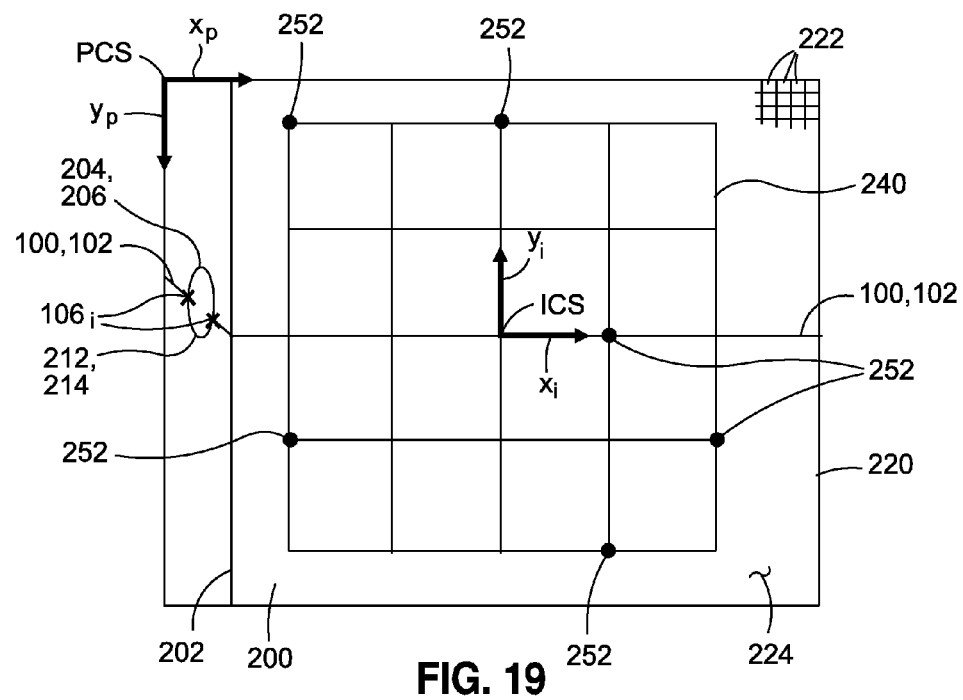

PROJECTION AIDED FEATURE MEASUREMENT USING UNCALIBRATED CAMERA

FIELD

The present disclosure relates generally to measurement systems and, more particularly, to systems for measuring features using a laser and at least one uncalibrated camera.

BACKGROUND

During the process of assembling a structure, it is typically desirable to inspect the structure to determine whether certain features are located within design tolerances. For example, many structures are assembled using mechanical fasteners such as bolts or screws to attach mating parts to the structure. The mechanical fasteners may be installed in holes that are formed in the structure at a desired location. In order to provide sufficient strength to handle stresses transmitted to the structure by the mechanical fasteners, the holes are preferably located at a minimum distance from the edge of the structure.

Current methods of inspecting an assembly for the location of holes and other features include the use of hard tooling. Such hard tooling may be mounted to the assembly or to a fixture for holding the assembly in place. The hard tooling may include markings indicating the desired location of the features such as holes that may be formed in the assembly to allow the attachment of mating parts. Unfortunately, hard tooling must typically be fabricated with relatively tight tolerances which increases the overall cost of manufacturing the assembly. In addition, hard tooling may require manual engagement of the tooling to the assembly which may interrupt manufacturing operations. Furthermore, such hard tooling may require the use of skilled labor for inspecting the assembly in a time-consuming process of manually determining whether features in the assembly are located within design tolerances.

Another method of inspecting an assembly for the location of features includes the use of a coordinate measurement machine (CMM). A CMM may include a touch probe that may be mounted to a moveable arm or a gantry. The touch probe may be computer-controlled or manually-controlled to guide the touch probe to different inspection locations of the assembly. At each inspection location, the touch probe may be placed in contact with one or more features such as a hole in the assembly to determine the coordinates (i.e., x, y, z) of the features relative to a reference point on the assembly. The measured coordinates may be compared to a desired location of the feature to determine whether the feature location is within design tolerances. Unfortunately, CMMs are typically relatively expensive and may require the use of skilled labor for operating a CMM. A further drawback associated with CMMs is that the moveable arm or gantry of the CMM may provide limited access to certain areas of the assembly. Even further, production of the assembly may be halted when the CMM is in use resulting in a negative impact on the production schedule.

As can be seen, there exists a need in the art for an automated system and method for accurately measuring the size and location of the features of an article. Furthermore, there exists a need in the art for a system and method for non-invasively measuring the features of an article without suspending manufacturing operations. In addition, there exists a need in the art for a system and method for measuring the features of an article that is of low cost and which is adaptable for inspecting a wide variety of article configurations.

SUMMARY

The above-noted needs associated with the measuring of the features of an article are specifically addressed and alleviated by the present disclosure which, in an embodiment, provides a method of measuring a feature of an article. The method may include projecting a scale template onto the article at a predetermined size. The method may additionally include projecting a measurement pattern onto the article. The method may include recording an image containing the feature, the scale template, and the measurement pattern using the camera. The method may further include determining a scale factor of the image based on the scale template, and determining a size and/or a location of the feature based upon the measurement pattern and the image scale factor.

Also disclosed is a vision system for non-invasively measuring the features of an article. The vision system may include a laser projector, a camera, and a processor. The laser projector may be configured to project a scale template and a measurement pattern onto the article. The scale template may be projected at a predetermined size on the article. The scale template and/or the measurement pattern may overlap the feature. The camera may be configured to record an image containing the feature, the scale template, and the measurement pattern. The processor may be configured to determine an image scale factor of the image based upon the scale template. The processor may also be configured to determine a size and/or a location of the feature based upon the image scale factor and the measurement pattern.

In a further embodiment, disclosed is a method of measuring a feature of an article. The method may include projecting a camera calibration template at a known location onto an article surface. The method may additionally include recording, using a camera, an image containing the feature and the camera calibration template. The camera may be calibrated based on the image and the known location of the camera calibration template on the article surface. The method may further include determining at least one of a size and a location of the feature based upon the calibration of the camera.

In a further embodiment, disclosed is a vision system for measuring a feature of an article. The vision system may include a laser projector, a camera, and a processor. The laser projector may be configured to project a camera calibration template onto the article at a known location. The camera calibration template and/or a measurement pattern may overlap the feature. The camera may be configured to record an image containing the feature and the camera calibration template. The processor may be configured to calibrate the camera using the camera calibration template. The processor may also be configured to determine at least one of a size and a location of the feature based upon the image and the calibration of the camera.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 18 is a perspective view of the article illustrating the hole located on a feature surface that is different than the article surface onto which the camera calibration template is projected;

FIG. 19 is a view of an image containing the camera calibration template and the measurement pattern projected onto the article illustrated in FIG. 18.

DETAILED DESCRIPTION

Figure 1:
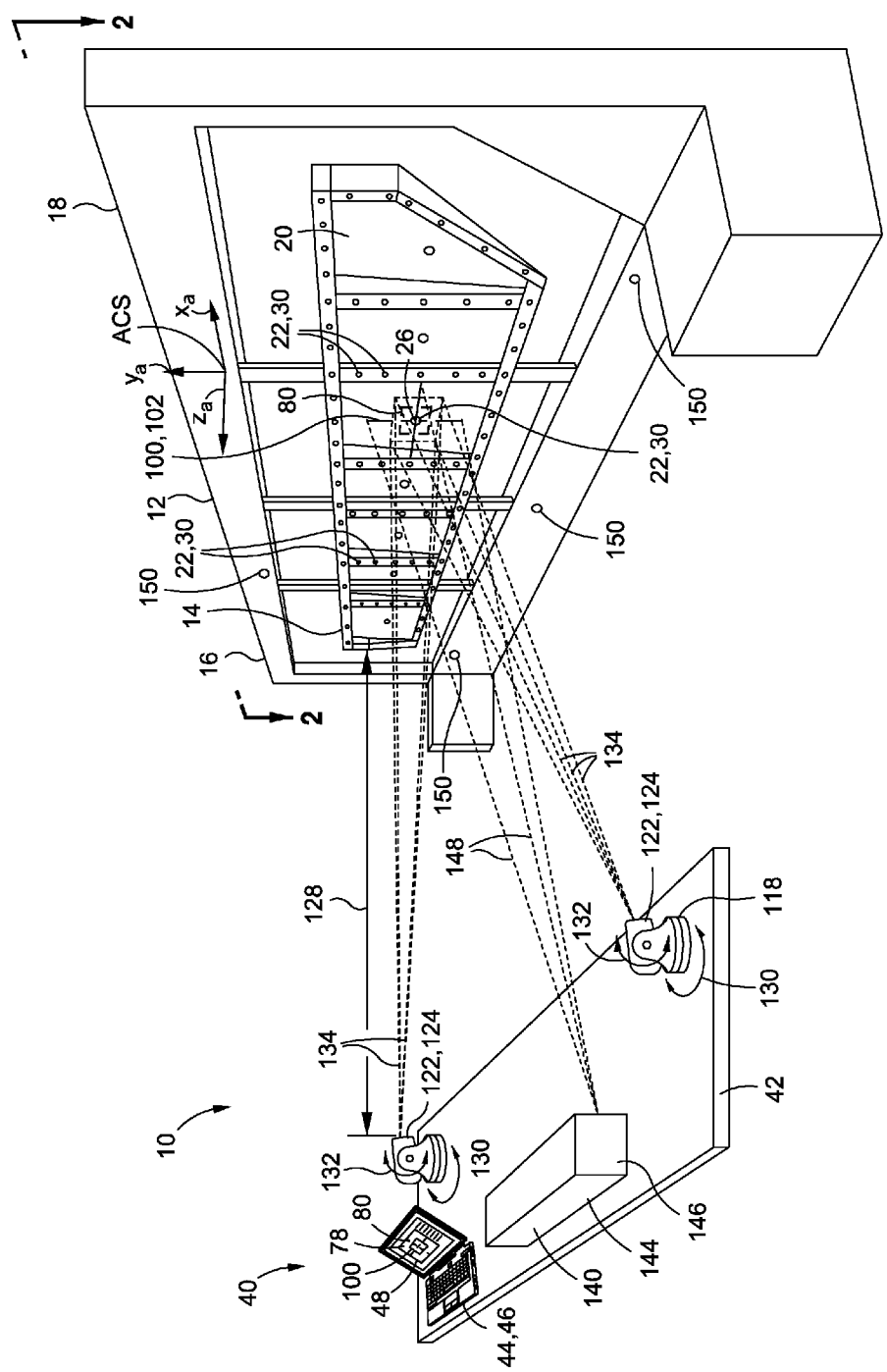
FIG. 1 is a perspective illustration of an embodiment of a workstation having a vision system including a pair of cameras and a laser projector for measuring features of an article.

Referring now to the drawings wherein the showings are for purposes of illustrating various embodiments of the disclosure, shown in FIG. 1 is a workstation 40 having a vision system 10 for measuring one or more geometrical features 22 of a work piece or an article 14. The vision system 10 may include at least one laser projector 146 and one or more uncalibrated cameras 122 for measuring the features 22 of the article 14 which may be undergoing manufacturing operations at the workstation 40. The article 14 may comprise a single work piece that may be supported by a stationary fixture 12. The article 14 may also comprise an assembly of work pieces that may be supported by the fixture 12.

As shown in FIG. 1, the laser projector 146 may emit a laser beam 148 that may be rapidly and repetitively scanned or steered in a predetermined manner such that the laser beam 148 appears on the article 14 surface as a constant, glowing shape in the form of a scale template 80 (e.g., the square shape in FIG. 1) and a measurement pattern 100 (e.g., the cross hairs 102 in FIG. 1). The scale template 80 may be projected onto the article 14 at a predetermined size and in a predetermined shape. The scale template 80 may be projected over a feature 22 to be measured or the scale template 80 may be projected adjacent to the feature 22 such as to one side of the feature 22. The measurement pattern 100 may also be projected onto the article 14 at a predetermined size and shape. The laser projector 146 may project the measurement pattern 100 such that the measurement pattern 100 overlaps a feature 22 of the article 14.

The measurement pattern 100 may be projected in a shape that designates a desired location 26 (FIG. 1) of a feature 22 (FIG. 1). For example, the measurement pattern 100 (FIG. 1) may be projected as a set of orthogonal cross hairs 102 (FIG. 1) that intersect one another at a desired location 26 representing a nominal center of a hole 30 in the article 14 (FIG. 1). The laser projector 146 may sequentially project the scale template 80 and the measurement pattern 100 onto a series of selected features 22 of the article 14. The movement of the laser projector 146 in projecting the scale template 80 and the measurement pattern 100 from feature 22 to feature 22 may be controlled by a processor 46 and may be based on a computer-aided-design (CAD) model of the article 14 as described in greater detail below.

Figure 7:
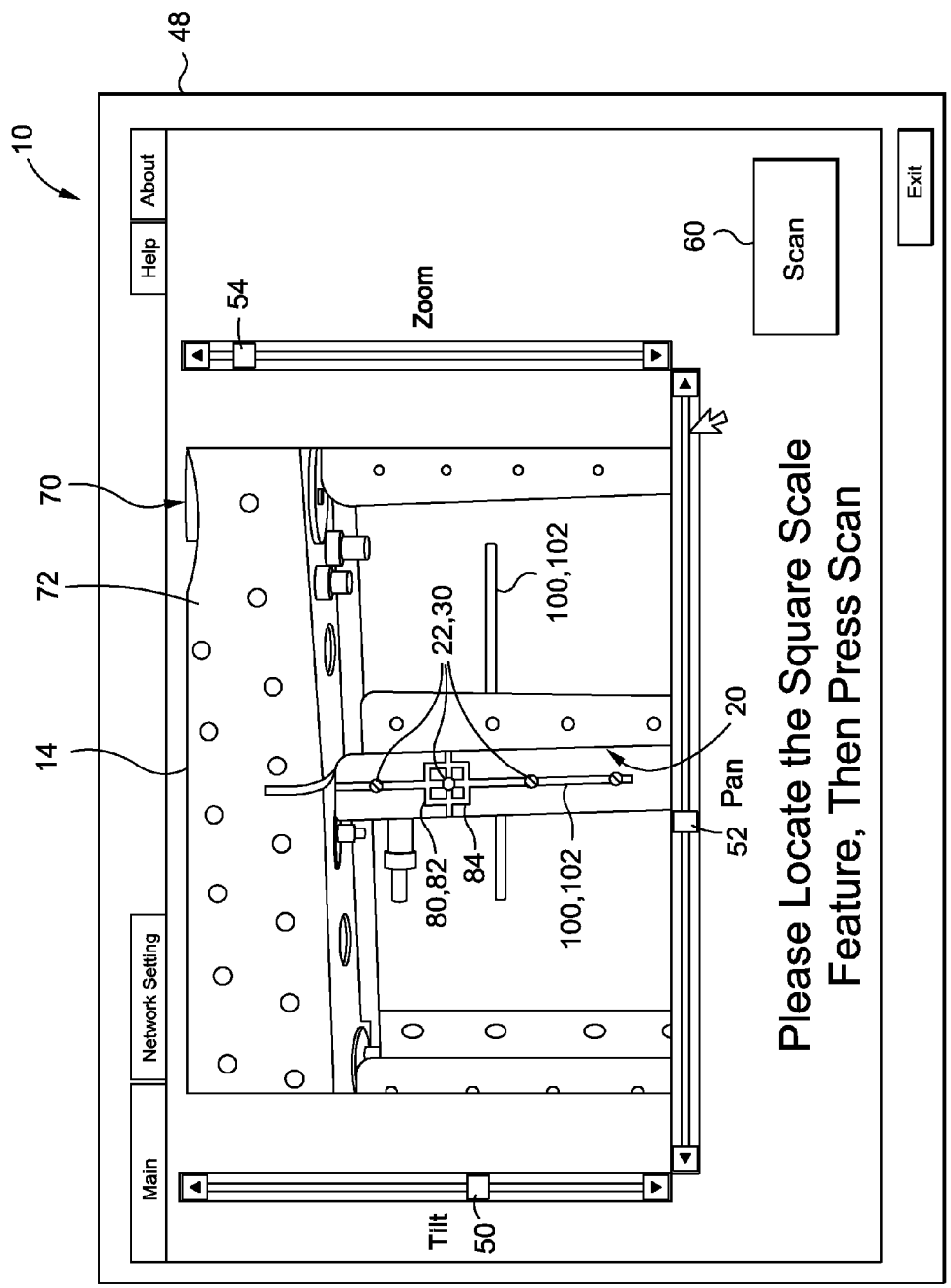
FIG. 7 is an illustration of a graphical user interface (GUI) displaying a recording of an image of a portion of the article having a feature and illustrating the projection of the scale template and the measurement pattern onto the article.

Referring still to FIG. 1, the one or more cameras 122 of the vision system 10 may be continuously re-oriented to follow the movement of the laser projector 146 as the laser projector 146 sequentially projects the scale template 80 and the measurement pattern 100 onto the selected features 22 of the article 14. At each one of the features 22, the cameras 122 may record one or more images 70 (FIG. 7). The cameras 122 may have pan capability and/or tilt capability to allow the cameras 122 to move along a pan direction 130 and/or along a tilt direction 132. The cameras 122 may also have optical zoom capability such that the magnification of each image 70 may be maximized to enhance the accuracy of the analysis of each image 70 as described below. The magnification of each image 70 may increase the accuracy of measurement calculations during image analysis. Each image 70 may optionally be sized such that the field of view includes an edge 20 of the article 14 such that the location of the feature 22 relative to the article edge 20 may be determined during image analysis. The process of sequentially projecting the scale template 80 and the measurement pattern 100 and recording an image 70 may continue until the cameras 122 have recorded images 70 (FIG. 11) of substantially all of the desired or selected features 22 of the article 14.

Each image 70 (FIG. 7) may be processed or analyzed by determining at least one image scale factor of the image 70 based upon a predetermined or known size of the projected scale template 80 onto the article 14. For example, an image 70 may be analyzed to determine the quantity of image 70 pixels 72 extending linearly along a length of a template element 82 (FIG. 8) of the scale template 80. The template element 82 may be oriented along at least one direction of the scale template 80. For example, one or more of the template elements 82 may be oriented substantially parallel to an x-axis of an image coordinate system (FIG. 9) of the image 70 and/or substantially parallel to a y-axis of the image coordinate system.

The image scale factor(s) of each image 70 (FIG. 7) may be expressed as a quantity of image 70 pixels 72 per unit length of the image 70. The image scale factor(s) of each image 70 may be used to determine the as-built condition of the article 14 (FIG. 1). More specifically, one or more image scale factors of the image 70 may be used to determine the geometric characteristics or geometric data associated with each feature 22. Such geometric data may include, but is not limited to, a measured size of each feature 22 and/or a measured location 28 (FIG. 13) of each feature 22 relative to the article edge 20 and/or relative to another feature 22. The measured geometric data of each feature 22 may be compared to a nominal or desired geometric characteristic of the feature 22 such as the nominal or desired size of the feature 22 and/or the nominal or desired location 26 of the feature 22. The comparison of the measured data with the nominal data of a feature 22 may facilitate a determination as to whether the size and/or location of the feature 22 is within design tolerances and whether a deviation 110 (FIG. 10) or non-conformance condition exists.

Referring still to FIG. 1, the article 14 may be fixedly mounted to the fixture 12 which may comprise an assembly fixture 12. The assembly fixture 12 may be located in a factory setting or in manufacturing environment or in other settings. For example, in a manufacturing setting, one or more manufacturing operations may be performed on the article 14. Such manufacturing operations may include the formation of holes, slots, grooves, cutouts, and any one of a variety of other types of features 22 in the article 14. The manufacturing operations may also include the mounting or assembly of mating parts (not shown) to the article 14. The measurement of such features 22 using the vision system 10 may include measuring the size and/or location of such features 22 as indicated above. The measurement of such features 22 using the vision system 10 may additionally include the measuring of the location of edges (not shown) of mating parts, subassemblies, hardware, systems, or subsystems, coatings, surface treatments, adhesive layers, composite plies, composite manufacturing materials, and any one of a variety of other elements or components, without limitation, that may be included with, installed on, mounted to, applied over, or otherwise associated with the article 14.

The vision system 10 may also be installed at a workstation located in a non-production environment such as in a testing environment. For example, the vision system 10 may be installed in a test laboratory wherein the article 14 may be a test article (not shown) mounted to a test fixture (not shown). The vision system 10 may be configured to monitor, record, measure, and/or analyze geometric data associated with one or more features 22 of a test article in response to thermal, vibration, shock, and/or acoustic stimuli of the test article and/or in response to static and/or dynamic loading or other testing operations that may be performed on the test article. For example, the vision system 10 may monitor the response of the test article to static loads by projecting the scale template 80 and the measurement pattern 100 onto selected features 22 of the test article, recording images 70 (FIG. 11) of the selected features 22 during testing, and analyzing the images 70 of the features 22 to detect deflections or deformations in the test article. The analysis of the images 70 may be performed in real time or during post-test analysis.

Referring to FIGS. 1-4, in an embodiment, the cameras 122 and the laser projector 146 may be mounted on a support 42 such as a work stand. The cameras 122 and the laser projector 146 may be mounted in a manner that provides substantially unobstructed, line-of-sight access to the article 14. However, the cameras 122 and laser projector 146 are not limited to mounting to a work stand and may optionally be mounted to a floor, a ceiling, one more walls or dividers, or to any other type of fixed or temporary structure (not shown) that may be located at the workstation 40. For example, the cameras 122 and/or laser projector 146 may also be mounted on a mobile or portable platform (not shown) such as a tripod or other movable support that may be moved into position at a desired workstation 40 containing an article 14. Advantageously, the cameras 122 and laser projector 146 may be mounted in a manner that avoids disrupting the article 14 manufacturing workflow and factory operations in general.

The vision system 10 is shown in FIGS. 1-4 in an embodiment having a first camera 124 and a second camera 126 as part of a camera system 118. However, any number of cameras 122 may be included with the camera system 118. In an embodiment, each one of the cameras 122 may record an image 70 (FIG. 7) of each one of the selected features 22. The processor 46 may select one of the images 70 recorded by the cameras 122 for further analysis. The image 70 may that may be selected as the image 70 for further analysis may be the image 70 recorded by the camera 122 that is located closest to feature 22 and/or that has the smallest perspective angle (not shown) of the image 70. The image 70 that may be selected for further analysis may also be the image 70 providing a higher degree of accuracy for image analysis relative to the images 70 recorded by the other camera(s) 122. Other factors may be considered when selecting among the images 70 for image analysis as described in greater detail below.

In an embodiment, the camera system 118 may contain multiple cameras 122 (FIG. 1) which may be networked together to provide coverage for the desired locations of the article 14 (FIG. 1). The cameras 122 may be individually mounted such as on a base (not shown) allowing movement of the cameras 122 in the pan direction 130 and/or tilt direction 132. However, the cameras 122 may optionally be mounted in groups or clusters (not shown) wherein each cluster may be mounted to a single base (not shown) allowing movement of the camera cluster in the same direction. The cameras 122 of the vision system 10 may be configured substantially similar to one another or the cameras 122 may have different configurations with different imaging capabilities, different resolutions, and different pan, tilt and zoom capabilities.

Figure 3:
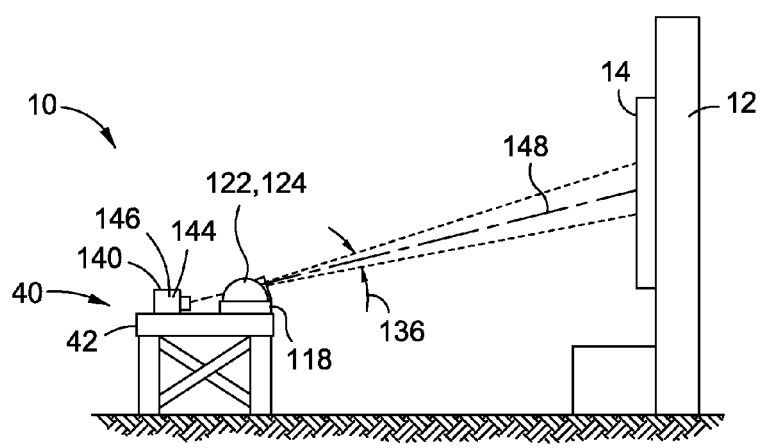
FIG. 3 is a side view of the workstation and vision system taken along line 3 of FIG. 1.

The cameras 122 may be located at a predetermined distance 128 (FIG. 1) from the article 14 to facilitate the determination of the amount of pan and/or tilt that may be required of the cameras 122 to move in coordination with the movement of the laser projector 146 (FIG. 3). In this regard, the locations of the cameras 122 may be defined by article coordinate system ACS coordinates (i.e., $x_a$, $y_a$, $z_a$) relative to the ACS origin or relative to a predetermined reference point (not shown) of the article 14. The known distance 128 or location of the cameras 122 relative to the article 14 may allow for accurate control of the camera 122 movement (e.g., pan, tilt, zoom) as described in greater detail below. The cameras 122 may be controlled by a computer 44 (FIG. 1) or a central processor 46 (FIG. 1) or by a network of processors cooperating to regulate the operation of the cameras 122 in coordination with the laser projector 146. The network of cameras 122 may be positioned in a manner to record images 70 (FIG.

7) of substantially all of the desired features 22 (FIG. 1) of the article 14 during the different stages of manufacture, assembly, or testing.

Figure 2:
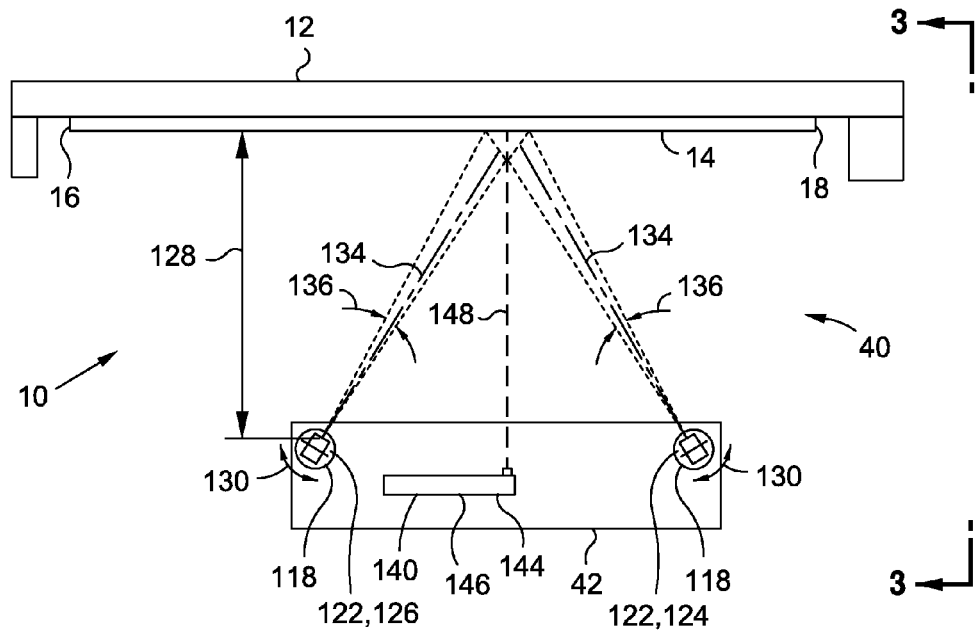
FIG. 2 is a top view of the workstation and vision system taken along line 2 of FIG. 1.

As shown in FIGS. 1-4, in an embodiment, the vision system 10 may include a single laser projector 146 as part of the projector system 140. The single laser projector 146 may be mounted in a manner that allows for substantially unobstructed projection of the laser beam onto the article 14 (FIG. 1). For example, as shown in FIG. 2, the laser projector 146 may be mounted in a manner to allow for substantially unobstructed projection to locations on the article 14 extending between the first end 16 and the second end 18 of the article 14 and to locations in between the first and second ends 16, 18. Although a single laser projector 146 is shown, the projector system 140 may include any number of laser projectors 146. For example, two or more laser projectors 146 may be networked together to provide coverage for one or more sides of an article 14 or to provide coverage along a substantially full length or a substantially full width of the article 14 if such length or width of the article 14 is greater than the coverage that can be provided by a single laser projector 146. The projector system 140 may optionally include laser projectors 146 that may be positioned in a manner to project the scale template 80 and measurement pattern 100 onto the top and bottom sides (not shown) of the article 14.

The laser projector 146 (FIG. 3) may emit a laser beam 148 (FIG. 3) having a wavelength in the visible spectrum although wavelengths in the non-visible spectrum (e.g., infrared) are contemplated. Advantageously, the color of the laser beam 148 (e.g., green) may be selected such that the projection of the scale template 80 (FIG. 1) and the measurement pattern 100 are highly visible to the vision system 10 (FIG. 1) cameras 122 (FIG. 1) in a variety of ambient lighting conditions. For example, the color of the laser beam 148 (FIG. 3) may be such that the projection of the scale template 80 (FIG. 1) and the measurement pattern 100 are visible to the cameras 122 in direct sunlight, in fluorescent lighting conditions of a manufacturing environment, and in regions of relatively low light as a result of shadows on the article 14 (FIG. 1) from obstructions. The laser projector 146 may be calibrated and certified at a laser projector 146 factory such that the projections of the scale template 80 and the measurement pattern 100 may be accurate within a restively tight tolerance. For example, in an embodiment, the laser projector 146 may have a positional accuracy of +/−0.015 inch or less (i.e., +/−0.010, +/−0.005, etc.) at a projection distance of 15 feet or more.

Referring to FIG. 1, the laser projector 146 may be indexed to or aligned with the article 14 prior to initiating the measurement process as described below. In this regard, the laser projector 146 may be indexed to the article 14 to define the location and orientation of the laser projector 146 relative to the article 14. The laser projector 146 may be indexed to the article 14 by aligning the laser projector 146 with indexing targets 150 of known location relative to one another and relative to the article 14. For example, as shown in FIG. 1, four (4) indexing targets 150 may be used to align the laser projector 146 to the article 14. The indexing targets 150 may be formed of retro-reflective material in a rounded shape of relatively small diameter (e.g., ½ inch) to facilitate relatively accurate centering of the laser beam 148 onto the indexing targets 150 during indexing. However, the targets 150 may be provided in any size, shape, configuration, and quantity, without limitation.

The indexing targets 150 may be mounted off of the article 14 such as on the fixture 12 as illustrated in FIG. 1. The mounting of the indexing targets 150 off of the article 14 may minimize or reduce hardware requirements and eliminate the time and cost associate with designing, fabricating, installing, and removing such hardware from the article 14. In a non-limiting embodiment, the fixture 12 may include an indexing target 150 mounted adjacent to each one of the first and second ends 16, 18 of the article 14, an indexing target 150 mounted approximately midway between the indexing targets 150 at the first and seconds ends 16, 18, and an indexing target 150 mounted to the fixture 12 along the top of the fixture 12. The indexing targets 150 may be mounted in a non-symmetrical manner relative to one another to facilitate indexing of the laser projector 146 to the article 14. For example, at least one of the indexing targets 150 (e.g., the uppermost indexing target 150 in FIG. 1) may be positioned in non-linear relation to the remaining indexing targets 150 (e.g., the three lowermost targets in FIG. 1). The indexing targets 150 may be mounted to the fixture 12 at predetermined locations which may be defined in terms coordinates (i.e., x, y, z) of an article coordinate system ACS relative to the ACS origin or relative to a predetermined reference point (not shown) of the article 14. The laser projector 146 may be indexed to the indexing targets 150 such that the projection of the scale template 80 and the measurement pattern 100 is positionally accurate relative to a nominal design configuration of the article 14.

Figure 4:
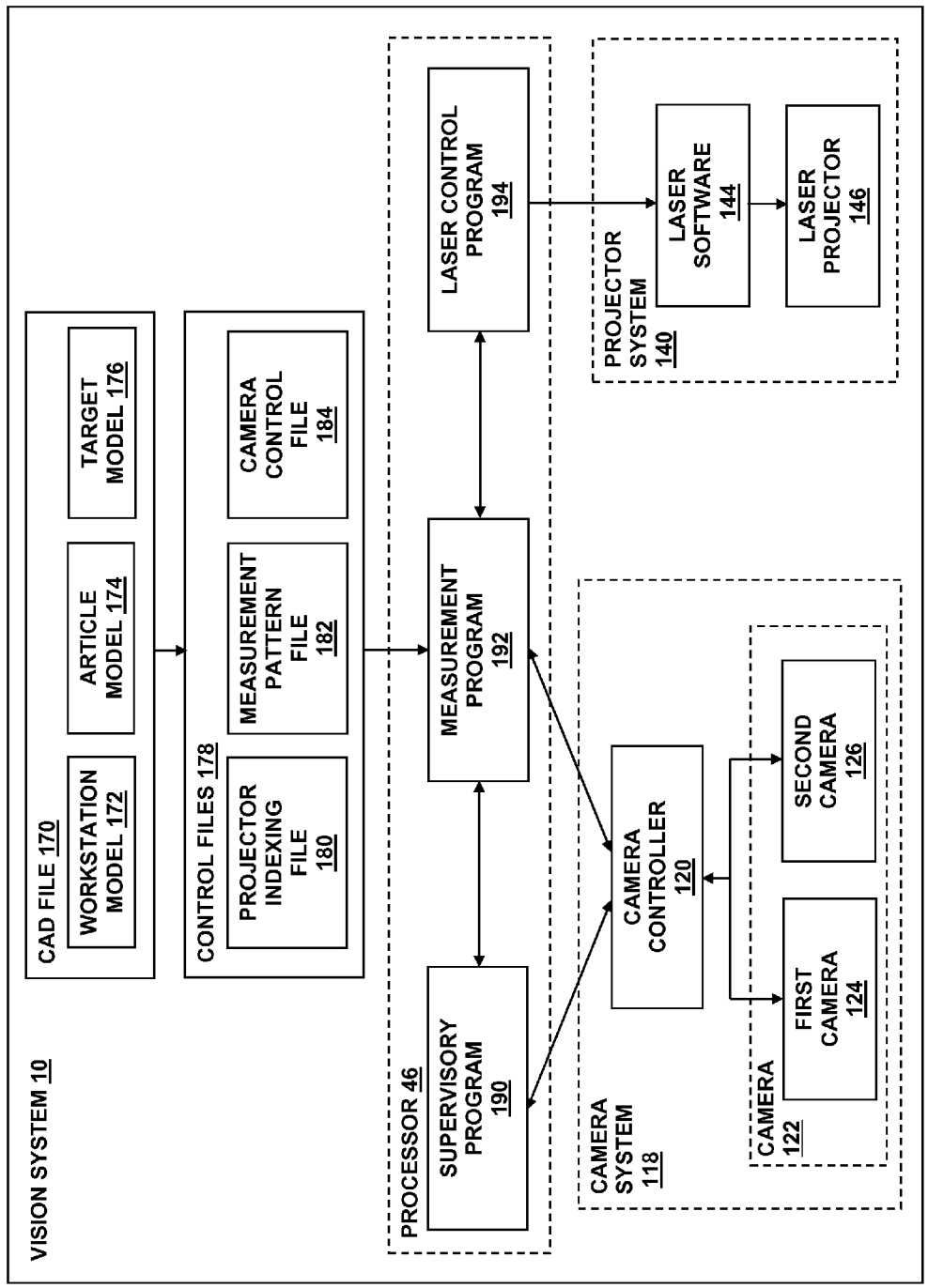
FIG. 4 is an illustration of a block diagram of the vision system.

Referring to FIG. 4, shown is a block diagram of an embodiment of the vision system 10 having one or more software modules or programs that may cooperate with one another to control the operation of the one or more laser projectors 146 and the one or more cameras 122 such as the first and second cameras 124, 126 of the vision system 10. In the embodiment shown in FIG. 4, the vision system 10 may include a supervisory program 190, a measurement program 192, and a laser control program 194. Although shown as being executed on a single processor 46, the supervisory program 190, the measurement program 192, and the laser control program 194 may be executed on several processors 46 (FIG. 1) that may be installed at one or more locations and communicating with one another via IP addresses. The supervisory program 190 may be used by a user to generally supervise the vision system 10 and to initiate the measurement of one or more features 22 of an article 14. The supervisory program 190 and the laser control program 194 may be communicatively coupled to the measurement program 192 as shown in FIG. 4 although the supervisory program 190 may also be coupled to the laser control program 194.

Figure 11:
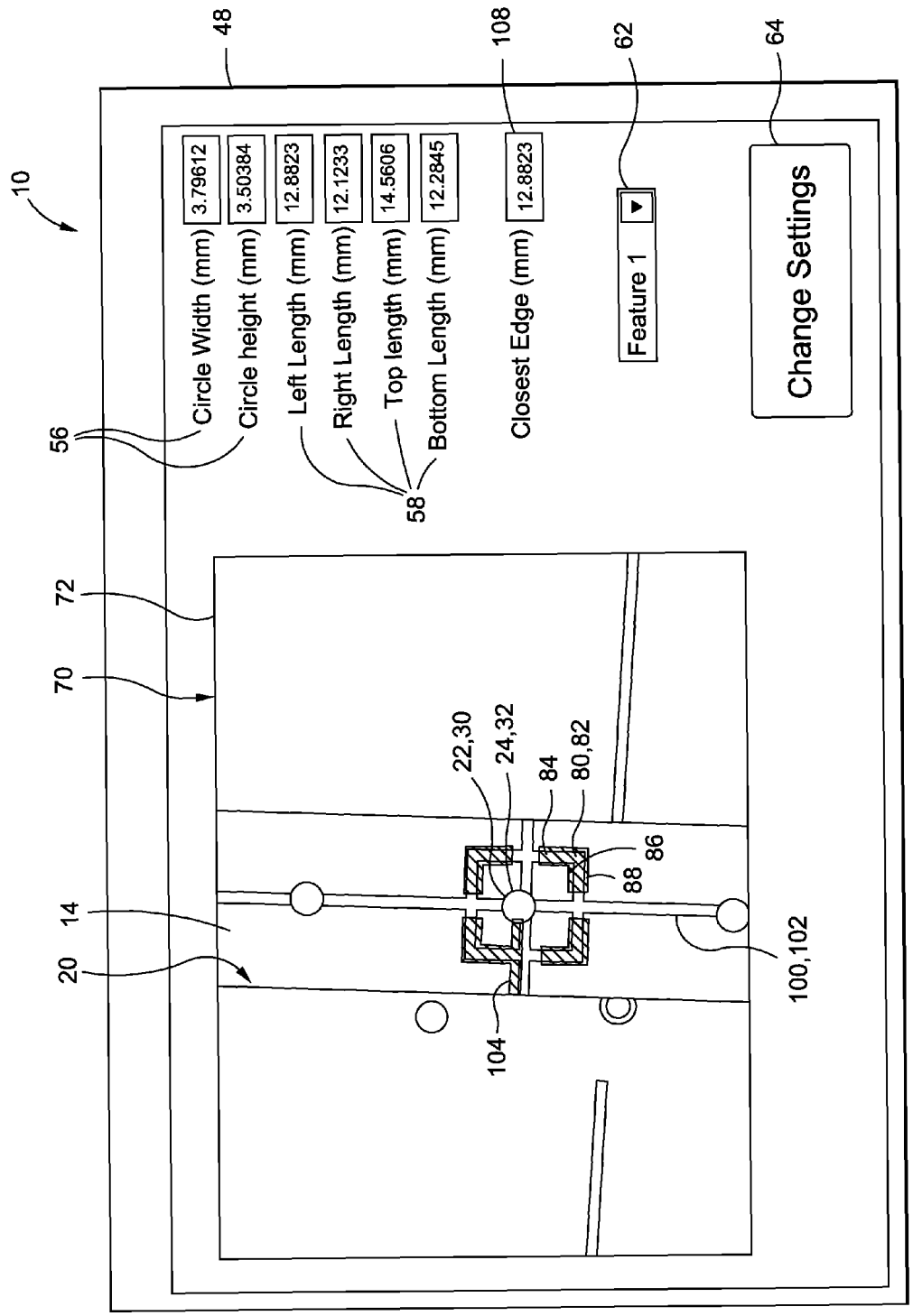
FIG. 11 is an illustration of a GUI displaying an image of the article and listing values of the size and location of the feature shown in the image.

The measurement program 192 may be coupled to the camera system 118 by hardwire connection and/or by wireless means and may control the operation of the cameras 122 through a camera controller 120. The camera controller 120 may be driven by a camera control file 184 in the measurement program 192 (FIG. 4) for controlling the orientation (i.e., pan, tilt) of the cameras 122 (FIG. 1) and controlling the recording of images 70 (FIG. 7) by the cameras 122 as described in greater detail below. The measurement program 192 may also receive from the camera controller 120 the images 70 (FIG. 7) recorded by the cameras 122. The supervisory program 190 (FIG. 4), through a user, may request control of the camera controller 120 from the measurement program 192 during a measurement process. For example, a user of the vision system 10 may view the real time imaging of a feature 22 using a graphical user interface 48 (GUI) illustrated in FIG. 7 as described below. Through pan control 52, tilt control 50, and zoom control 54 sliders included with the GUI 48, a user may adjust or refine the positioning and/or optical zoom of a given camera 122 prior to the recording of the image 70 by the camera 122. The supervisory program 190, through a user, may release the control of the camera system 120 back to the measurement program 192 at any time. The measurement program 192 may be configured to complete a given measurement process and deliver measurement data of the measured features 22 to the supervisory program 190 for storage in a configuration file (not shown) and/or for real time display such as on a GUI 48 as illustrated in FIG. 11 and described in greater detail below.

Referring still to FIG. 4, the laser control program 194 may be communicatively coupled to the measurement program 192 and to the projector system 140. The laser control program 194 may provide a means to transmit commands from the measurement program 192 to the projector system 140. The projector system 140 may comprise the laser projector 146 and the projector manufacturer's laser software 144 for operating the laser projector 146. The laser control program 194 may receive a projector indexing file 180 from the measurement program 192. The projector indexing file 180 may be generated by CAD macros based on a CAD file 170 containing a CAD model of the indexing targets 176, a CAD model of the article 174, and/or a CAD model of the workstation 172. The projector indexing file 180 may facilitate the indexing of the laser projector 146 to the article 14 prior to initiating the measurement process. The laser control program 194 may also receive the measurement pattern file 182 from the measurement program 192. The measurement pattern file 182 may include the coordinates of the features 22 to be measured and the order in which to measure the features 22 as briefly mentioned above and described in greater detail below.

Figure 5:
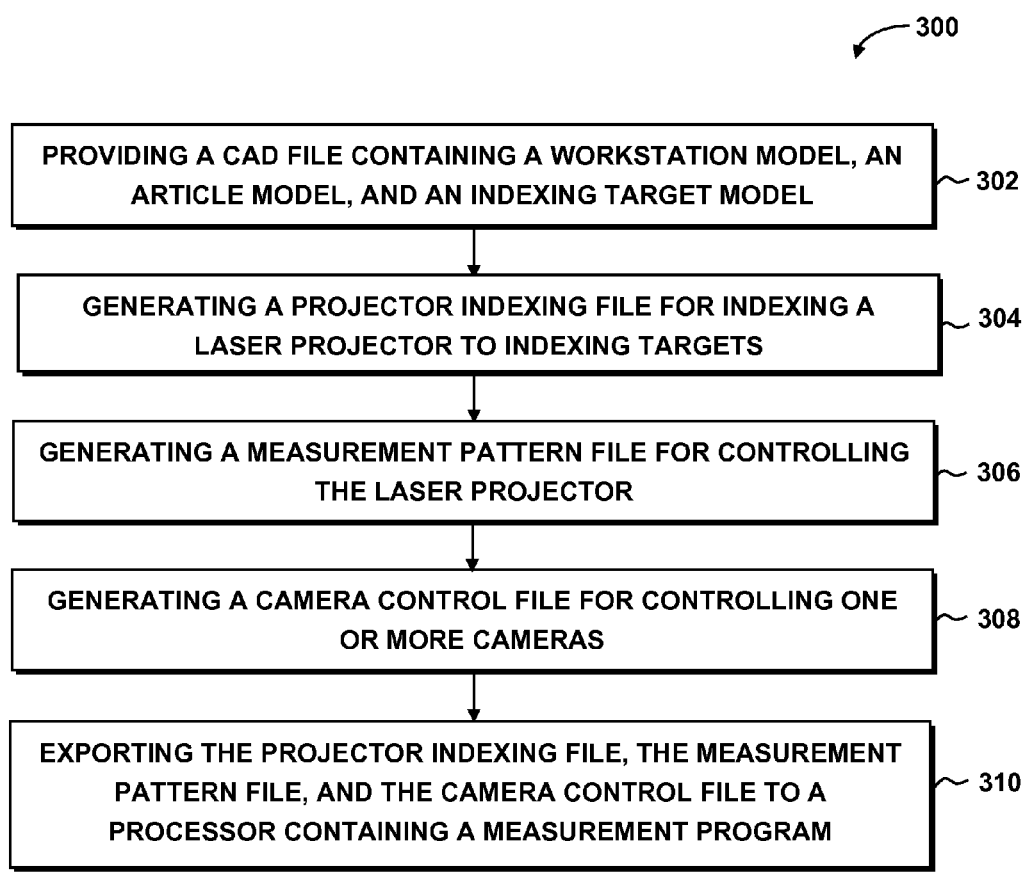
FIG. 5 is an illustration of a flow diagram of one or more operations that may be included in a methodology of generating one or more control files of the vision system.

Referring to the flow diagram of FIG. 5, shown is a methodology 300 of generating the control files 178 (FIG. 4) such as the projector indexing file 180 (FIG. 4), the measurement pattern file 182 (FIG. 4), and the camera control file 184 (FIG. 4). The control files 178 may facilitate the operation of the laser projector 146 and the cameras 122 and the analysis of the images 70 as described in greater detail below.

Step 302 of the methodology 300 of FIG. 5 may include providing a CAD file 170 (FIG. 4) containing a CAD model of the article 174 (FIG. 4), a CAD model of the workstation 172 (FIG. 4), and a CAD model of the indexing targets 176 (FIG. 4). The article model 174 may represent the geometry of the article 14 and the features 22 to be measured. The features 22 may be defined by reference coordinate system coordinates (i.e., x, y, z) (FIG. 1) relative to a reference point (not shown) of the article 14 (FIG. 1). The workstation model 172 may represent the geometry of the article 14 fixture 12. The target model 176 may represent the geometry and position of the indexing targets 150 (FIG. 1) at a known position relative to a reference point of the article 14. Alternatively, targetless features or devices (not shown) may be substituted for the indexing targets 150. In a non-limiting embodiment, the targetless features may include metrology receivers (not shown) at known locations on the fixture 12 and on the laser projector 146 and which may receive signals from at least one metrology transmitter (not shown) also at a known location relative to the fixture 12. The targetless features may be represented in the CAD file 170 by coordinates (i.e., x, y, z) relative to a reference point of the article 14 for indexing the laser projector 146 to the article 14.

The CAD file 170 (FIG. 4) is not limited to CAD models of a single article 174 configuration or a single workstation 172 (FIG. 4) configuration but may include a variety of different CAD models 174 of article and workstations having different configurations. CAD models 176 (FIG. 4) of different target configurations may also be provided. A library of different CAD files 170 may be provided with each CAD file 170 including different combinations of article models, workstation models 172, and target models 176. It should also be noted that the representation of the article 14, the workstation 40, and the indexing targets 150 are not limited to CAD models but may be defined by spreadsheets listing the ACS (FIG. 1) coordinates (i.e., x, y, z) of the geometry of the article 14, the workstation 40, and the indexing targets 150 (FIG. 1). Even further, the representation of the article 14 (FIG. 1), the workstation 40 (FIG. 1), and the indexing targets 150 may be provided in a .ply (i.e., polygon file format) file format or in any other suitable file format.

Step 304 of the methodology 300 of FIG. 5 may comprise generating the projector indexing file 180 (FIG. 4) for indexing the laser projector 146 (FIG. 4) to the indexing targets 150 shown in FIG. 1. Alternatively, the projector indexing file 180 may be generated using a target model containing targetless features (not shown). By indexing the laser projector 146 to the indexing target 150 or to targetless features, the laser projector 146 may be aligned or indexed with the article 14 (FIG. 1) geometry such that laser projector 146 may accurately move from an initial feature to subsequent features in a measurement process.

Step 306 of the methodology 300 of FIG. 5 may comprise generating the measurement pattern file 182 (FIG. 4). The measurement pattern file 182 may include the coordinates (i.e., x, y, z) of the features 22 (FIG. 1) to be measured on the article 14 (FIG. 1). The measurement pattern file 182 may additionally include a description of an optimal route for measuring the features 22 of the article 14. In this regard, the measurement pattern file 182 may define a relatively highly efficient sequence in which to measure the features 22 based upon a goal of minimizing the amount of time required to travsere the article 14 and project the scale template 80 (FIG. 1) and the measurement pattern 100 (FIG. 1) at each feature 22, and record an image 70 (FIG. 7) of each feature 22.

The measurement pattern file 182 may be generated by a CAD macro (not shown) using a selected CAD file 170 (FIG. 4) containing an article model 174 (FIG. 4) and a workstation model 172 (FIG. 4). The scale template 80 and the measurement pattern 100 may be generated based upon the geometry and location of each feature 22. The size and shape of the scale template 80 and the measurement pattern 100 for each feature 22 may be generated by the CAD macro and may be based upon the size and shape of the feature 22. In a preferred embodiment, the size of the scale template 80 is preferably substantially equivalent to or proportionate to the size of the feature 22 to increase the accuracy of image 70 analysis. As an alternative to the CAD macro generating the scale template 80 and measurement pattern 100 for the features 22, the size and shape of the scale template 80 and the measurement pattern 100 may be selected from a library of scale templates 80 and measurement patterns 100.

In Step 306, the location on the article 14 (FIG. 1) where the scale template 80 (FIG. 1) and measurement pattern 100 (FIG. 1) are projected may also be determined for each feature 22 (FIG. 1). For example, for a hole 30 (FIG. 1) located in the article 14 at a relatively short distance to an article edge 20, the scale template 80 may be generally centered over the hole 30 similar to that which is illustrated in FIGS. 7-11. For other features 22, the scale template 80 may be located off to one side of the feature 22. The size and shape of the scale template 80 may also be different for different features 22. For example, for a hole 30 located in a relatively narrow area of the article 14, a relatively small size (e.g., 0.5 inch square) scale template 80 may be selected. As indicated above, the scale template 80 is substantially equivalent or proportional in size to the feature 22 being measured. For example, for a hole 30 having a diameter of 0.5 inch, a 1.0 inch square scale template 80 may be selected. In contrast, for a hole 30 having a diameter of 0.25 inch, a 0.5 inch square scale template 80 may be selected. It should also be noted that the scale template 80 is not limited to a square shape but may be provided in any shape and size, without limitation. For example, the scale template 80 may be provided as a rectangle or as any multi-sided polygon. The scale template 80 may optionally include curved segments (not shown). The scale template 80 may also be provided in an open shape and is not limited to a closed shape such as a square-shaped scale template. For example, the scale template 80 may be provided as an asterisk (not shown) or other suitable open shapes.

Step 308 of the methodology 300 of FIG. 5 may include generating the camera control file 184 for controlling the one or more cameras 122 (FIG. 1) of the vision system 10. In an embodiment, the camera control file 184 (FIG. 4) may include instructions for tracking the movement of the laser projector 146. In this regard, the camera control file 184 may include instructions for coordinating the pan and tilt of each camera 122 (FIG. 1) to follow the laser projector 146 during the sequential projection of the scale template 80 (FIG. 1) and measurement pattern 100 (FIG. 1) from feature 22 to feature 22. The camera control file 184 may also specify the optical zoom for each camera 122 in a manner to maximize the magnification of the image 70 while keeping the feature 22 (FIG. 1), the scale template 80, and the measurement pattern 100 within the frame of the image 70. Each image 70 may also be sized such that one or more edges of the article 14 (FIG. 1) are within the frame of the image 70 such that the edge distance 108 of a feature 22 may be determined.

Step 310 of the methodology 300 of FIG. 5 may include exporting the control files 178 to the processor 46 for execution by the measurement program 192. As indicated above, the control files 178 (FIG. 4) may facilitate the operation of the laser projector 146 and the cameras 122 (FIG. 1) for measuring selected features 22 of an article 14. Prior to initiating the measurement of one or more features 22 (FIG. 1) of an article, the vision system 10 may prompt a user to enter the normal (i.e., perpendicular or shortest) distance 128 (FIG. 1) from each one of the cameras 122 to the article 14. Alternatively, the coordinates of each one of the cameras 122 relative to a reference point (not shown) of the article 14 may be entered. Alternatively, the distance 128 from the cameras 122 to the article 14 may be extracted from the workstation model 172 (FIG. 4) and article model 174 (FIG. 4). The distance 128 (FIG. 1) between the cameras 122 and the article 14 may be required to allow the pan and/or tilt of each camera 122 to be coordinated with the movement of the laser projector 146.

Referring to the flow diagram of FIG. 6 and with additional reference to the images 70 illustrated in FIGS. 7-13, a methodology 400 will now be described for measuring one or more geometric features 22 of an article 14. Any one of the steps described below for performing the methodology 400 may be implemented by the processor 46 (FIG. 1) such as by the supervisory program 190, the measurement program 192, and/or the laser control program 194 (FIG. 4). In addition, any one of the steps of the methodology 400 may be assisted by a GUI 48 (not shown) that may be provided to the user such as on a laptop computer 44 (FIG. 1) or a workstation computer (not shown) that may be located at the workstation 40 (FIG. 1) or at a remote location. The methodology 400 may be assisted by a workstation computer that may be used by an operator during assembly operations such as for accessing work instructions for the article 14 or recording work completed on the article 14 (FIG. 1). The GUI 48 may allow a user to manipulate the supervisory program 190, the measurement program 192, and/or the laser control program 194 during any one of the below-described steps. In addition, the GUI 48 may allow a user to observe the progress in measuring and analyzing the features 22 of an article 14.

Figure 6:
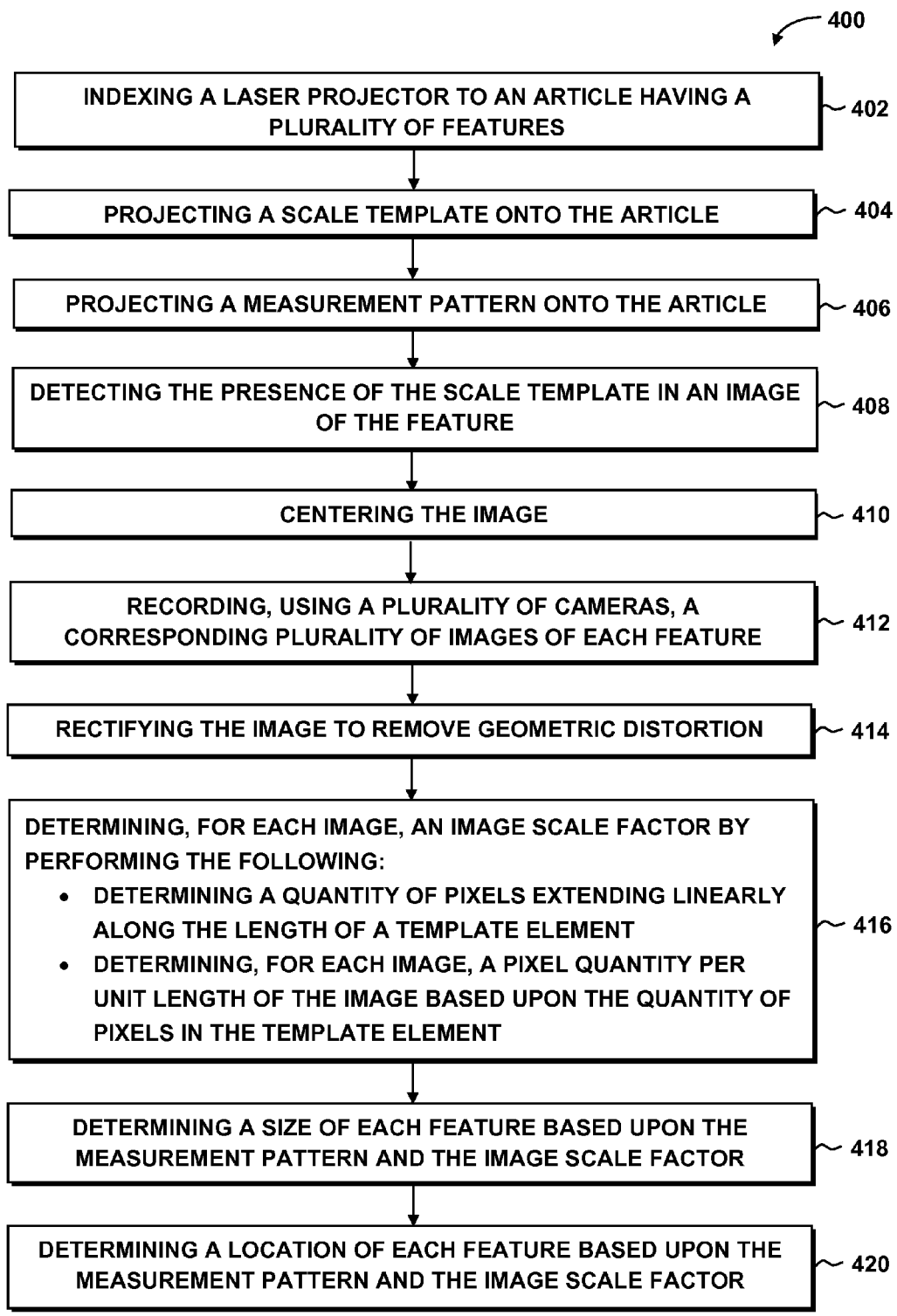
FIG. 6 is an illustration of a flow diagram of one or more operations that may be included in a methodology of measuring one or more features of the article.

Step 402 of the methodology 400 of FIG. 6 may comprise indexing the laser projector 146 to the article 14 using the indexing targets 150 (FIG. 1). The indexing process may be defined by the projector indexing file 180 (FIG. 4). In an embodiment, indexing targets 150 may be mounted at locations off of the article 14 such as on the fixture 12 (FIG. 1) at known locations relative to one another and relative to the article 14, as described above. Alternatively, the laser projector 146 (FIG. 1) may be indexed to one or more targetless features (not shown) as mentioned above. By indexing the laser projector 146, the position of the laser projector 146 relative to the article 14 may be defined such that the scale template 80 and the measurement pattern 100 may be projected onto each feature 22 with a relatively high degree of positional accuracy. In addition, by indexing the laser projector 146, the laser projector 146 may accurately move the projection of the scale template 80 and the measurement pattern 100 from feature 22 to feature 22.

Step 404 of the methodology 400 of FIG. 6 may comprise projecting a scale template 80 (FIG. 1) onto the article 14 (FIG. 1) near a feature 22 (FIG. 1) or overlapping a feature 22. For example, FIG. 7 illustrates a square-shaped scale template 80 projected onto an article 14 such that the square scale template 80 circumscribes a hole 30 (FIG. 1) in the article 14. However, the scale template 80 may be projected to one side of the feature 22 to be measured. For example, the square scale template 80 may be projected between any one of the sets of holes 30 illustrated in the image 70 of FIG. 7. Preferably, the scale template 80 is projected on or near the feature 22 being measured in order to increase the accuracy of image analysis as described below. The scale template 80 may be projected on the article 14 at any one of a variety of sizes and shapes and is not limited to a square shape. For example, the scale template 80 may be projected as a rectangle or as a polygon having any number of sides as indicated above. The scale template 80 may optionally include curved elements (not shown). Furthermore, the scale template 80 may be provided in an open shape such as an asterisk (not shown) and is not limited to a closed shape such as a square or a rectangle.

In the image 70 shown in FIGS. 7-11, the scale template 80 may include at least one template element 82 that may be projected so as to appear as a relatively straight line when viewed along the direction of the laser beam 148 (FIG. 1) and/or when viewed in an image 70 recorded by the camera 122 (FIG. 1). In this regard, the laser projector 146 (FIG. 1) may be configured to project the scale template 80 onto a non-planar surface (not shown) or a contoured surface (not shown) such that one or more template elements 84 of the scale template 80 appear as a straight line in the image 70 recorded by one or more of the cameras 122. Advantageously, the projection of one or more template elements 84 as a straight line allows for a determination of at least one image scale factor of the image 70 for use during image analysis. The laser projector 146 may project the scale template 80 (FIG. 1) onto the article 14 such that the scale template 80 has a predetermined or known length to facilitate the determination of the image scale factor. As described below, the image scale factor may be expressed as a quantity of pixels 72 (FIG. 9) extending linearly along a template element of known length. By determining at least one image scale factor for each image 70 in terms of pixel quantity per unit length, the size and/or the location of one or more features 22 may be determined.

Step 406 of the methodology 400 may comprise projecting a measurement pattern 100 (FIG. 1) onto the article 14 (FIG. 1). The measurement pattern 100 may overlap a feature 22 to be measured. For example, the images illustrated in FIGS. 7-11 show the measurement pattern 100 as cross hairs 102. The cross hairs 102 may intersect one another at a desired or nominal location of the center of the hole 30 being measured. Although FIGS. 7-11 illustrate the measurement pattern 100 as cross hairs 102, the measurement pattern 100 may be projected onto the feature 22 at any one of a variety of different shapes and is not limited to the cross hairs 102 configuration. The projection of the scale template 80 and the measurement pattern 100 onto the article 14 may be controlled by the laser control program 194 (FIG. 4) which may accept commands from the measurement program 192 (FIG. 4). The commands received by the laser control program 194 may be forwarded to the laser software 144 for controlling the laser projector 146.

Step 408 of the methodology 400 of FIG. 6 may comprise detecting the presence of the scale template 80 in the image 70 of the feature 22 acquired by one or more cameras 22 (FIG. 1). The cameras 122 (FIG. 1) may be oriented to focus on the feature 22 over which the scale template 80 and the measurement pattern 100 are projected. The cameras 122 may be oriented in the pan direction 130 and/or tilt direction 132 (FIG. 1) under the control of the camera controller 120 which may receive commands from the measurement program 192 and/or supervisory program 190 (FIG. 4). As indicated above, the camera controller 120 may be driven by the camera control file 184. A user may also manually adjust the pan and/or tilt of the camera 122 using the pan control 52 and/or tilt control 50 of the GUI 48 as shown FIG. 7 until a scale template 80 is visually detected.

Figure 12:
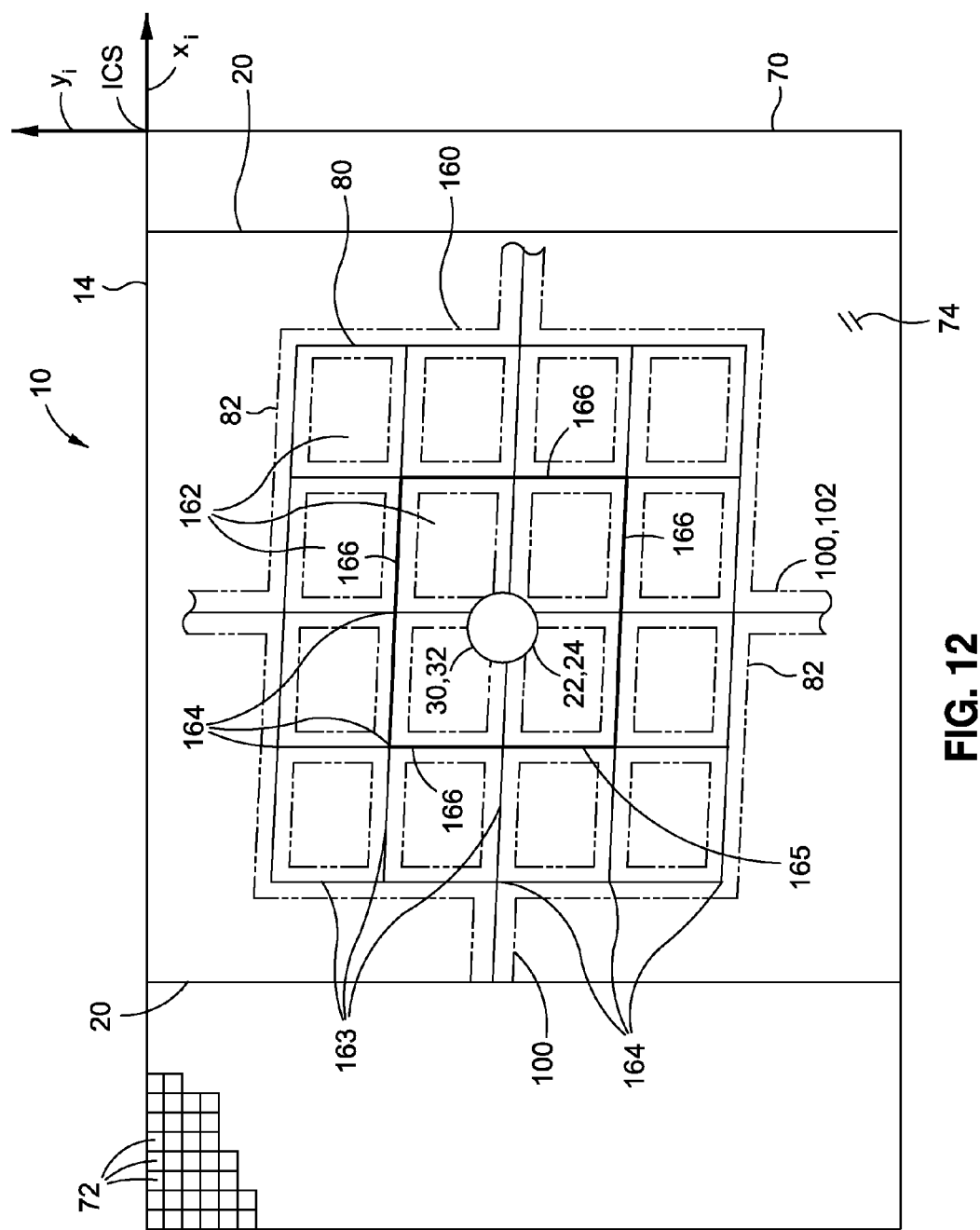
FIG. 12 a view of an image of a grid pattern for rectifying geometric distortion of an image.
Figure 13:
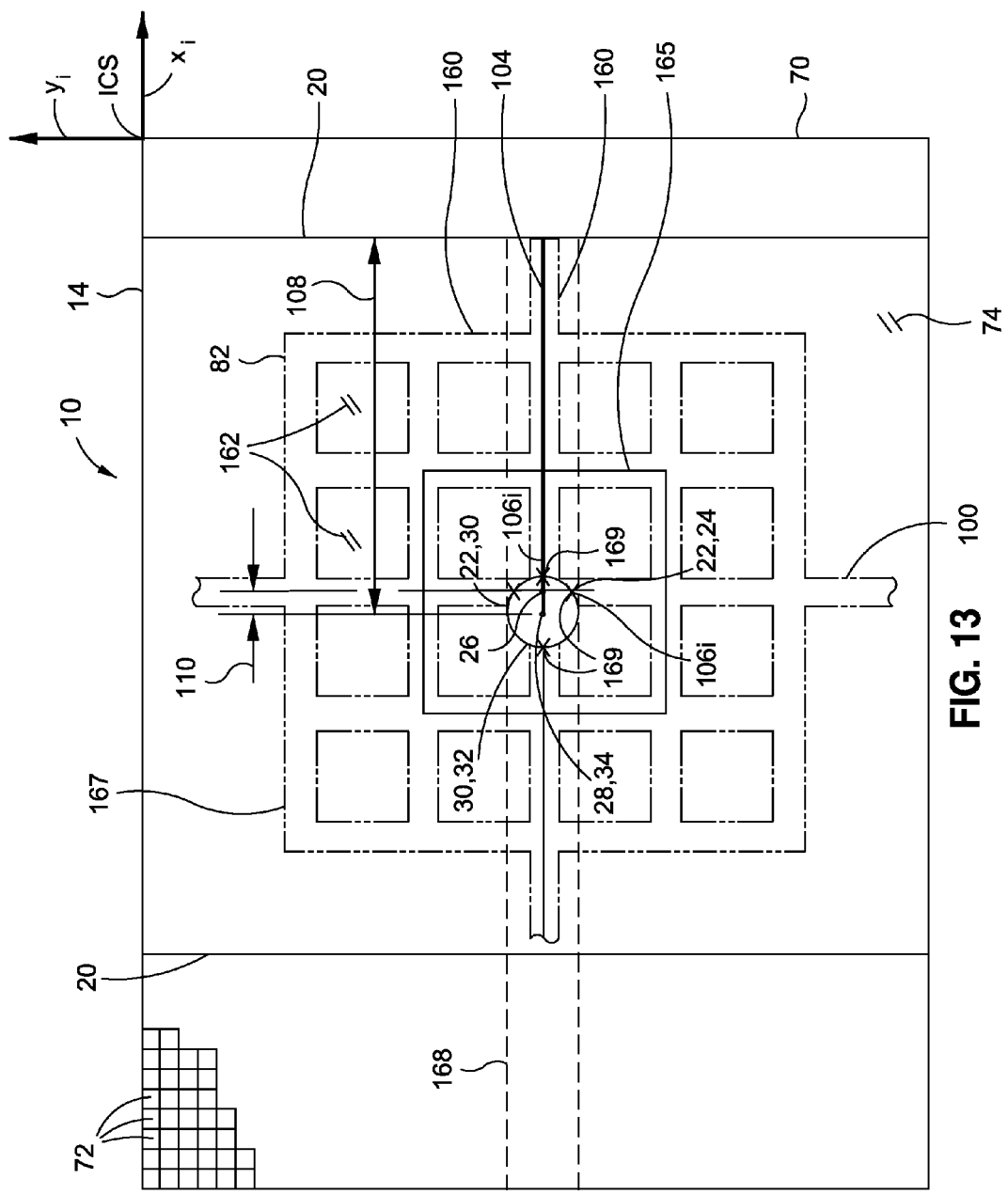
FIG. 13 is a view of the image of FIG. 12 following rectification of the image and removal of the geometric distortion and further illustrating a measurement pattern extending between an edge of the article and a perimeter of the hole.

Step 410 of the methodology 400 of FIG. 6 may comprise centering the feature 22 (FIG. 1), the scale template 80 (FIG. 1), the measurement pattern 100 (FIG. 1), and/or the article edge 20, within the field of view 136 (FIG. 1) of each camera 122 (FIG. 1) after the scale template 80 has been detected. The centering of the image 70 may be performed by calculating a relationship between the movement of the camera 122, and the region of the article 14 captured within the image 70 or within the field of view 136 of the camera 122. The relationship between the movement of the camera 122 and the region captured within the image 70 (FIG. 7) may be based upon the pan, tilt, and zoom of the camera 122 and the distance of the camera 122 from the feature 22. The distance of the camera 122 from the feature 22 may be determined by adjusting the previously entered distance 128 to account for any contours or curvature in the article 14 surface and adjusting for the current pan and tilt setting of the camera 122 relative to the previous pan and tilt setting. Alternatively, contour or curvature in the article 14 may be flattened by rectifying the image 70 to remove geometric distortion as illustrated in FIGS. 12-13 and described in greater detail below. The size of the region captured within the image 70 may be determined by calculating at least one image scale factor for the image 70. The image scale factor may be calculated by determining a quantity of pixels 72 (FIG. 9) extending linearly along a length of a template element 82 in at least one direction of the scale template 80.

Figure 8:
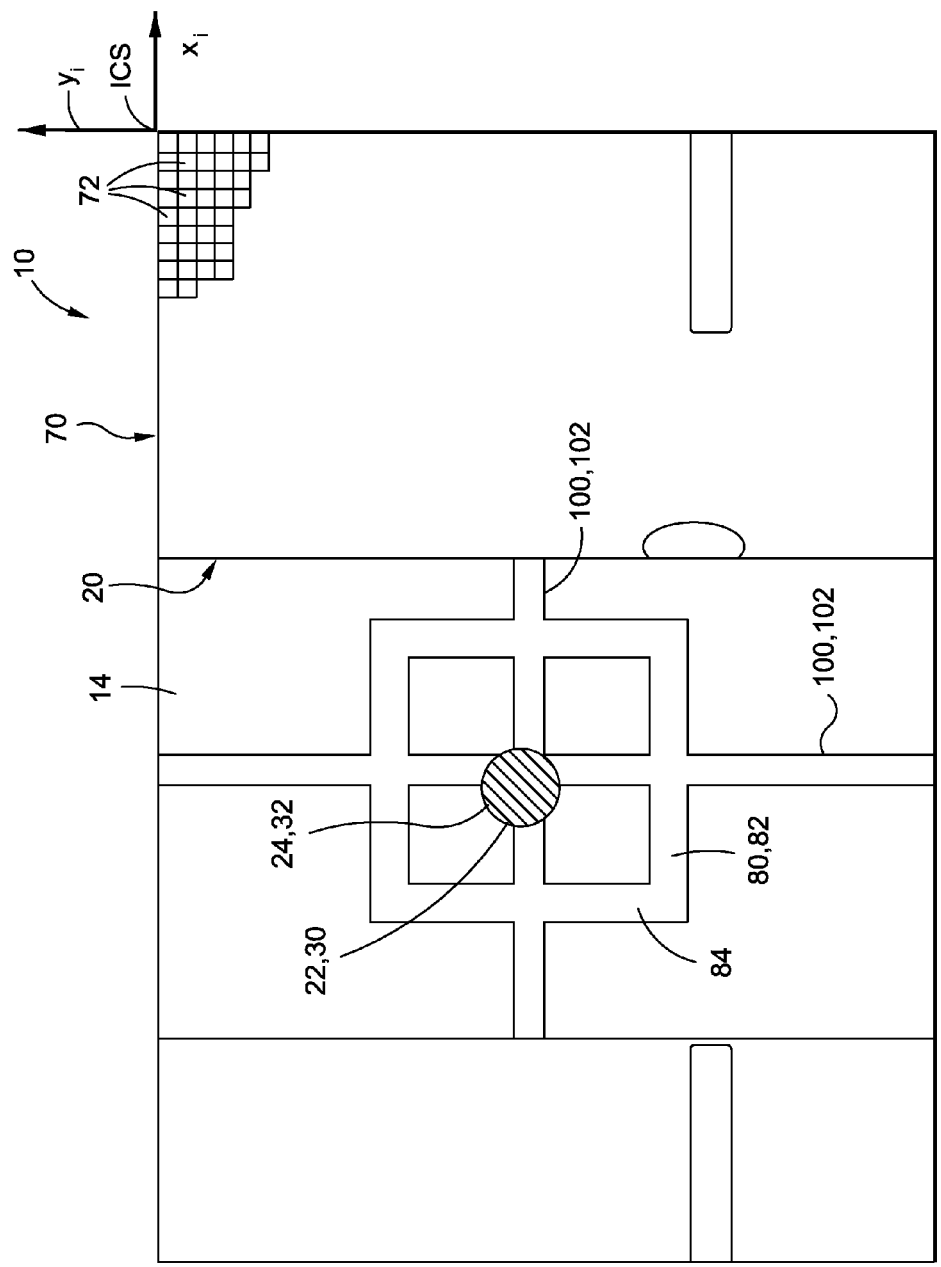
FIG. 8 is an enlarged view of the image shown in FIG. 7 and including the scale template and the measurement pattern overlapping a hole formed in the article.

For example, FIG. 8 illustrates the square-shaped scale template 80 having four (4) template elements 84 which comprise the template sides 84 of the scale template 80. By knowing the size at which the scale template 80 is projected onto the article 14 (e.g., 1.0 inch square), a pixel quantity per unit length may be determined. The pixel quantity per unit length may represent the image scale factor of the image 70 and may be used to determine the size (e.g., length or width) of the region in the image 70 and the distance from the scale template 80 to an edge of the image 70. In this same manner, the relative location of the measurement pattern 100, the feature 22, and the article edge 20 may be determined. By knowing the field of view 136 of the camera 122 (FIG. 1) based upon the current zoom level and knowing the size of the region in the image 70 and the distance from the scale template 80 to the image 70 border, the amount of camera 122 adjustment (i.e., pan, tilt) required to center the scale template 80 may be determined. Alternatively, a user may manually center the image 70 by adjusting the pan control 52 or tilt control 50 on the GUI 48 as illustrated in FIG. 7.

Following the centering of the image 70, the optical zoom of the camera 122 may be adjusted to maximize the size of the feature 22 (FIG. 1), the scale template 80 (FIG. 1), the measurement pattern 100 (FIG. 1), and/or the article edge 20 (FIG. 1) within the image 70. Maximizing the optical zoom may increase the accuracy of the image analysis that may be performed after the image 70 is recorded and saved. For multiple cameras 122 (FIG. 1), the vision system 10 may compare the images 70 (FIG. 7) of each feature 22 captured by each camera 122 and select a preferred one of the camera images 70 based upon one or more factors or attributes. Factors or attributes that may be weighed in selecting a preferred one of the images 70 include the distance from each camera 122 to the feature 22. For example, the image recorded by the camera closest to the feature may be selected. Additional factors that may be weighed in selected a preferred one of the images 70 include the perspective angle of each camera 122 relative to feature 22. In this regard, the image 70 recorded by the camera 122 having the smallest angle of the camera 122 optical axis 134 (FIG. 1) relative to the laser beam 148 (FIG. 1) may be selected. Other factors that may be weighed in selecting a preferred one of the images 70 include the position of the feature 22 relative to the article edge 20, and the most favorable image 70 from an image analysis standpoint. For example, the image 70 having the highest resolution of all the images 70 of a given feature 22 may be selected.

After centering and maximizing the optical zoom of the image 70 (FIG. 7) and selecting the image 70 from among multiple images 70 captured by multiple cameras 122, the image 70 may be saved along with the corresponding pan, tilt, and zoom values. The image 70 may optionally be displayed on a GUI 48 (not shown) such that a user may follow the measurement process. In the event that the image 70 is manually centered and the zoom is manually adjusted, the user may select a scan button 60 (FIG. 7) on the GUI 48 to command the processor 46 to record the image 70.

Step 412 of the methodology 400 of FIG. 6 may comprise projecting the scale template 80 and the measurement pattern 100 (FIG. 1) onto each of the remaining features 22 defined by the measurement pattern file 182. Once the laser projector 146 (FIG. 1) projects the scale template 80 and the measurement pattern 100 onto a new feature 22 in the measurement sequence, the cameras 122 (FIG. 1) may be reoriented by adjusting the pan and tilt to capture an image 70 of the feature 22 and to center each image 70 (FIG. 7) as described above. The zoom level of each camera 122 may also be adjusted. An image 70 may be recorded at each feature 22. The image 70 may preferably contain the feature 22, the scale template 80, and the measurement pattern 100. The image 70 may optionally include one or more article edges 20 such that the edge distance 108 (FIG. 1) of the feature 22 may be determined. Where multiple cameras 122 are used, a preferred one of the images 70 (FIG. 7) recorded by one of the cameras 122 may be selected and saved to the measurement program 192 as indicated above. The measurement process may continue until at least one image 70 has been recorded for each one of the selected features 22.

Step 414 of the methodology 400 of FIG. 6 may include rectifying one or more images 70 (FIG. 7) that may be selected for further analysis. The rectification of an image 70 may comprise removing geometric distortion from the image 70 and may be implemented for images of substantially planar article surfaces. For example, referring to FIG. 12-13, shown is an image 70 of a grid pattern 160 projected onto a substantially planar article surface of an article 14 for rectification of the image 70. The grid pattern 160 in FIGS. 12-13 is preferably, but optionally, provided as a four-by-four square grid pattern 160 although the grid pattern 160 may have a larger or smaller total quantity of squares 162 than the four-by-four square grid pattern 160 shown. A larger total quantity of squares 162 may increase the accuracy of image analysis. The grid pattern 160 may optionally include a larger quantity of squares 162 along a vertical direction than the quantity of squares along the horizontal direction, or vice versa.

In Step 414, the grid pattern 160 may be projected onto a substantially planar surface of the article 14 (FIG. 1) and an image 70 may be recorded as shown in FIG. 12. Due to the orientation and position of the camera 122 (FIG. 1) relative to the article 14, the grid pattern 160 may appear geometrically distorted. To remove the geometric distortion and rectify the image 70, the image 70 (FIG. 7) may be processed by extracting the laser color band (e.g., green) and thresholding the image 70 to produce a binary (e.g., black on white) image 70. The image 70 may undergo a morphological clean-up operation to improve image sharpness such as by closing the image 70 to remove holes followed by thinning the image 70 up to the point where further thinning would result in discontinuities in the image 70. Straight line segments 163 or template elements of the image 70 (FIG. 7) may be identified by performing a Hough transform with non-maximal suppression. As shown in FIG. 12, line segments 163 may be defined for the grid pattern 160. Intersection points 164 of substantially all of the line segments 163 may also be defined.

In FIG. 12, a connected components analysis may be performed on the image 70. The inner two-by-two square 165 have line segments 163 broken by the hole 30 may be identified and may correspond to the component with a convex area being smaller in size relative to a convex hull defined by the grid pattern 160. The convex hull of a polygon defining the image coordinates of the inner two-by-two square 165 may be calculated and simplified to find corners of the two-by-two square 165. The corners corresponding to four cardinal directions 166 of the two-by-two square 165 may be identified for computing a planar homography or perspective transformation between an image plane 74 having units in pixels 72 and the planar surface of the article 14 having length units such as inches or millimeters. An inverse of the perspective transformation may then be applied to the image 70 shown in FIG. 12 to provide a rectified view of the image 70 as shown in FIG. 13. It should be noted that the rectification process of Step 414 of FIG. 6 is a non-limiting embodiment of rectification of an image 70 and is not to be construed as limiting other techniques that may be implemented on the scale template 80 and/or measurement pattern 100 for removing or reducing geometric distortion in an image 70.

Step 416 of the methodology 400 of FIG. 6 may comprise determining at least one image scale factor for use in image analysis and for calculating the measurements (e.g., size, location) of a feature 22 (FIG. 1). The image scale factor used in calculating the feature 22 measurements (e.g., size and location) may have a relatively higher degree of accuracy or precision than the above-mentioned image scale factor used in the laser projection of the scale template 80 and measurement pattern 100 (FIG. 1). In this regard, the image scale factor used in laser projection may be performed with a reduced level of accuracy to reduce the computational intensity and thereby reduce the amount of time required for the measurement program 192 (FIG. 4) to perform processing operations when projecting the laser beam 148 from feature-to-feature around the article 14. During image analysis, a relatively high degree of accuracy on the image scale factor is preferable at the expense of greater computational intensity and relatively longer processing time. However, it is contemplated that the image scale factor used during laser projection around the article 14 may also be used as the image scale factor for image analysis, or vise versa.

Referring to FIG. 8, the determination of at least one image scale factor of an image 70 may include determining a quantity of pixels 72 (FIG. 9) contained in an average length of the linear template element 82 of the scale template 80. For the square-shaped scale template 80 shown in FIG. 8, Step 416 may include determining the quantity of pixels 72 extending linearly along each one of the four (4) template sides 84. The process of determining the image scale factor may include extracting the laser color band of the scale template 80 from the image 70. The scale template 80 may be converted to binary and converted to a relatively solid laser line (not shown). Extraneous and/or relatively small objects (not shown) in the image 70 may be removed.

Figure 9:
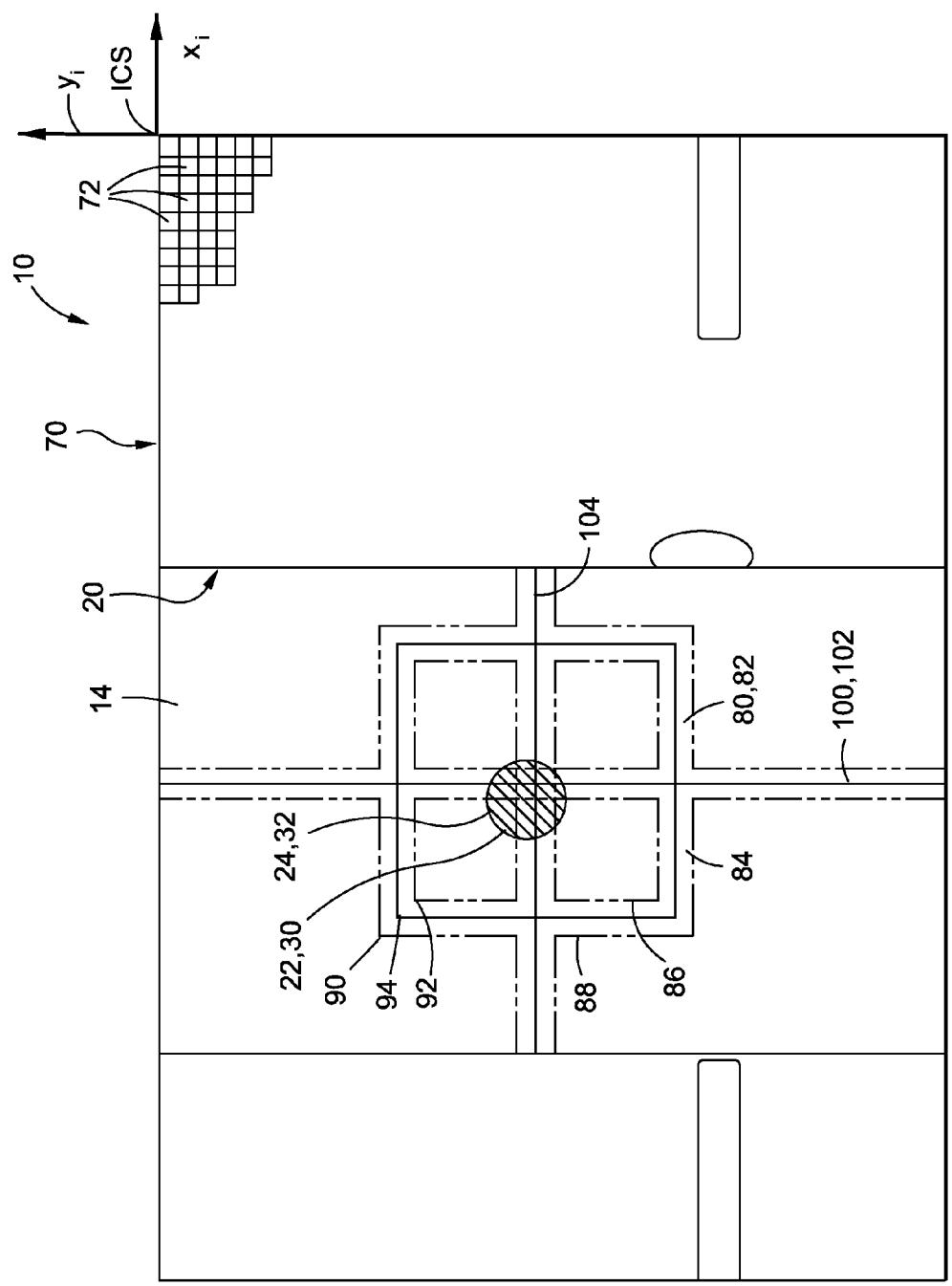
FIG. 9 is a view of the image of FIG. 8 and illustrating inner and outer boundaries of the scale template for determining a scale factor of the image.

Referring to FIG. 9, in a non-limiting embodiment of the methodology 400, an inner boundary 86 and an outer boundary 88 may be generated for the scale template 80. Each one of the inner and outer boundaries 86, 88 are shown in phantom and may intersect one another to define sets of inner and outer corners 90, 92. An intermediate corner 94 may be fitted between each one of the sets of inner and outer corners 90, 92. The intermediate corners 94 may be interconnected by a set of line segments 96. Each line segment 96 may be analyzed to determine the quantity of pixels 72 (FIG. 9) extending linearly along the line segment 96. In a non-limiting embodiment, the quantity of pixels 72 may be determined for one or more line segments 96 extending in a direction substantially parallel to an x-axis $x_i$ of an image coordinate system (ICS). Likewise, the quantity of pixels 72 may be determined for one or more line segments extending in a direction substantially along or parallel to a y-axis $y_i$ of the ICS. The quantity of pixels 72 in the line segments 96 extending substantially parallel to the x-axis $x_i$ of the ICS may be averaged. Likewise, the line segments 96 extending substantially parallel to the y-axis $y_i$ of the ICS may be averaged.

Because the scale template 80 is projected onto the article 14 at a predetermined size (e.g., 1.0 inch square), the quantity of pixels 72 in the averaged line segments 96 substantially parallel to the x-axis $x_i$ may be used to determine a pixel quantity per unit length of the image 70 along a direction of the x-axis which may serve as the image scale factor along a direction of the x-axis $x_i$. Likewise, the quantity of pixels 72 in the averaged line segments 96 substantially parallel to the y-axis $y_i$ may be used to determine a pixel quantity per unit length along a direction of the y-axis $y_i$ which may serve as the image scale factor along the y-axis $y_i$ and which may be different than the image scale factor along the x-axis $x_i$ of the image 70 (FIG. 7). In this regard, it should be noted that image scale factors may be determined along any direction of the image and are not limited to the x-axis $x_i$ and y-axis $y_i$ directions of the image 70 as illustrated in FIG. 9. Furthermore, the image scale factors for each image 70 may be determined with regard to directions that are non-perpendicular to one another. Even further, more than two (2) image scale factors may be determined for a single image 70.

Step 418 of the methodology 400 of FIG. 6 may comprise determining a size of the feature 22 based upon the measurement pattern 100 (FIG. 1) and the image scale factor. The feature 22 (FIG. 1) size may be determined by defining the intersection of the measurement pattern 100 with an edge of the feature 22. For example, FIG. 9 illustrates the measurement pattern 100 configured as a set of cross hairs 102 oriented perpendicularly relative to one another. The cross hairs 102 are shown overlapping a perimeter of a hole 30. In order to improve the clarity or sharpness of the cross hairs 102, one or more image processing techniques may be performed on the cross hairs 102. For example, the regions of the image 70 surrounding the cross hairs 102 may be extracted. The color band (e.g., green) of the laser projection may be extracted from the cross hairs 102 and the extracted region may be converted to binary (e.g., black and white pixels). The cross hairs 102 may be dilated. One or more additional image processing steps may be performed on the image 70 to improve the clarity of the cross hairs 102.

Figure 10:
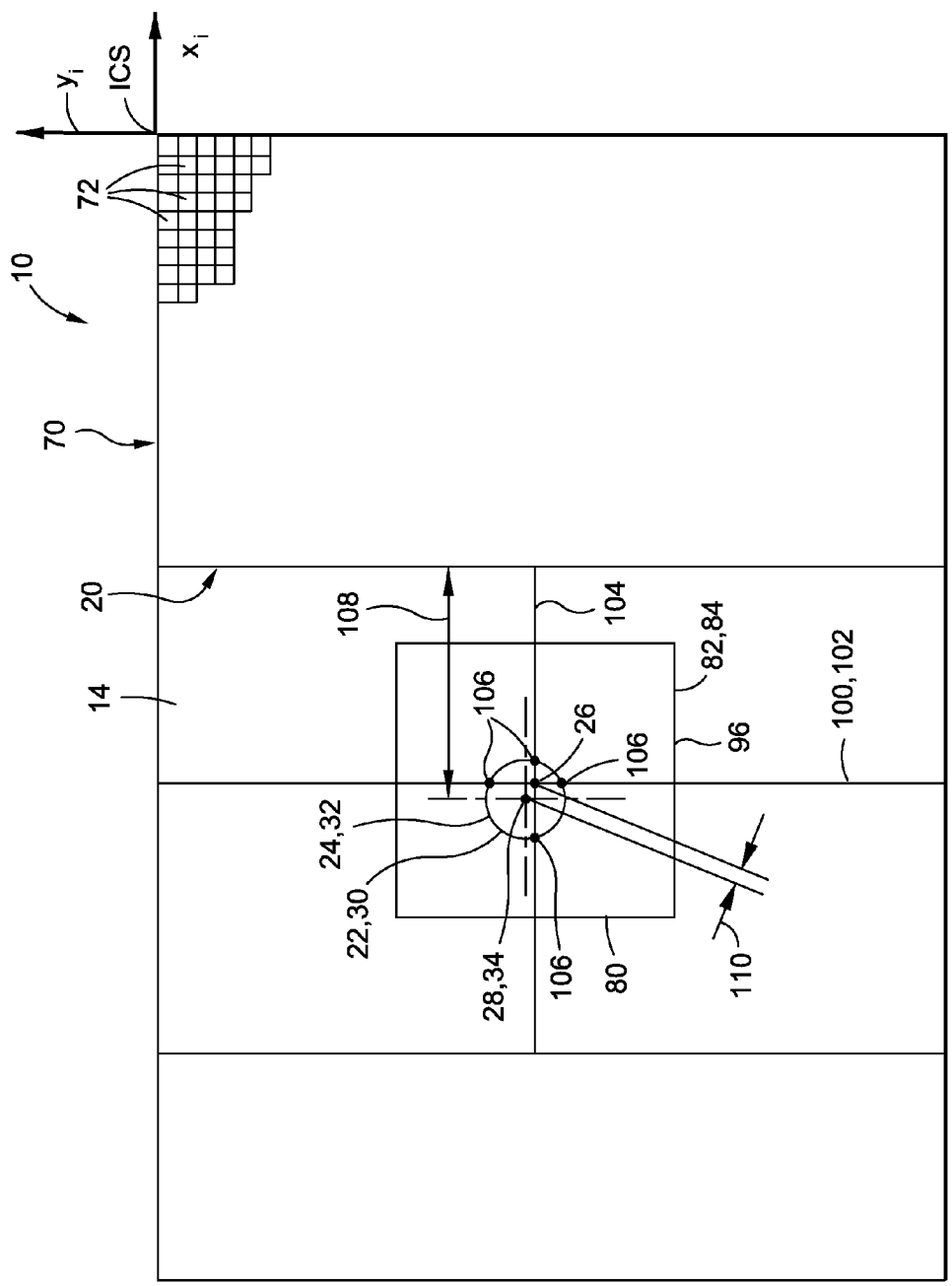
FIG. 10 is a view of the image of FIG. 9 and illustrating a pattern segment of the measurement pattern extending between an edge of the article and a perimeter of the hole.

Referring to FIG. 10, shown are intersections points defined where the cross hairs 102 intersect with the hole perimeter 32. By defining at least 3 intersection points 106$i$, and by knowing the image scale factor (i.e., pixel quantity per unit length) of the image 70, the diameter of the hole 30 may be determined. The measured hole 30 diameter may be compared to a nominal or desired hole 30 diameter to determine a deviation 110 of the measured hole 30 diameter. The numerical value of the measured hole 30 diameter may be displayed on a GUI 48 (not shown) and identified with the location of the hole 30 on the article 14. Although the step of determining the size of a feature 22 is described in the context of a determining the measured diameter of a hole 30, the process may be applied to determine the size of a wide variety of features and is not limited to determining a measured hole diameter. For example, the geometric size of a feature may be determined for a slot, a groove, a gap, an opening, a cutout, and any one of a variety of other types of features that may be included with or associated with the article 14.

Step 420 of the methodology 400 of FIG. 6 may comprise determining a measured location 28 (FIG. 10) of the feature 22 (FIG. 9) based upon the measurement pattern 100 (FIG. 9) and the image scale factor. The location of the feature 22 may be determined relative to a desired location 26 of the feature 22, relative to an edge of the article 20, and/or relative to a mating part (not shown) of the article 14. For example, referring to FIG. 10, the measured location 28 of a hole center 34 may be determined relative to a desired location 26 of the hole center 34 represented by the intersection of the cross hairs 102. The measured location 28 of the hole center 34 may be determined using the hole size data determined above in Step 418. Alternatively, the measured location 28 of the hole center 34 (FIG. 10) may be determined based upon a nominal diameter of the hole as may be defined by the article model 174 (FIG. 4). For example, by defining at least two intersection points 106, and by knowing the nominal diameter of the hole 30 and the image scale factor of the image 70, the measured location 28 of the hole center 34 may be determined. The measured location 28 of the hole center 34 may be compared to the desired location 26 of the hole center 34 to determine a deviation 110 in the hole 30 location. The measured location 28 of the hole center 34 may also be determined relative to the measured location 28 of another feature 22 such as the measured location 28 of an adjacent hole center 34.

The determination of the location of a feature 22 (FIG. 9) may further comprise determining an edge distance 108 (FIG. 10) of a feature 22 based upon the measurement pattern 100 (FIG. 9) and the image scale factor. Referring to FIG. 10, the cross hairs 102 may be projected onto the article 14 such that at least one of the cross hairs 102 is oriented substantially perpendicularly relative to the article edge 20. A pattern segment 104 of the cross hair 102 is shown in FIG. 10 extending between the article edge 20 and the hole perimeter 32. The length of the pattern segment 104 may be determined by counting the quantity of pixels 72 (FIG. 9) extending linearly (i.e., end-to-end) along the length of the pattern segment 104 in at least one direction of the image 70. For example, the length of the pattern segment 104 may be determined along an x-direction of an image coordinate system ICS.

The pixel quantity in the pattern segment 104 may be converted to a length measurement using the image scale factor. The length measurement may comprise the edge distance 108 between the article edge 20 and the hole perimeter 32. As shown in FIG. 11, values 58 of the feature locations 58 may be displayed in a GUI 48 which may also contain an image 70 of the feature 22 being measured. The GUI 48 may also display the values 56 of the feature 22 size as shown in FIG. 11. The GUI 48 may include a feature selector 62 to allow a user to call up a different one of the features 22 such that an image 70 of the feature 22 may be displayed on the GUI 48 along with the measured values of the feature 22. A setting selector 64 may also be included with the GUI 48 to allow a user to select a different article to be measured, or to change network settings or any one of a variety of other system settings.

The edge distance 108 (FIG. 10) between the hole center 34 (FIG. 10) and the article edge 20 (FIG. 10) may also be determined based on the process described above for determining the measured location 28 of the hole center 34. In addition, the edge distance 108 may be determined for features 22 other than holes 30. Furthermore, the distance between mating parts (not shown) that may be mounted to the article 14 may be determined based upon the feature 22 edges of the mating parts and discontinuities occurring in the measurement pattern 100 (FIG. 10) at locations where the measurement pattern 100 overlaps the edge 24 of a feature 22.

Referring again to FIG. 13, an embodiment for determining the size or location of a feature 22 using a grid pattern 160 will be described. The rectified image 70 of the article 14 shown in FIG. 13 may be generally located over the hole 30 in the article 14. The image 70 may be processed in a manner indicated above by extracting the laser color band (e.g., green) and converting the image 70 to binary and processing the image 70 to improve the image quality for measurement purposes. A connected components analysis may be performed on the image 70 in a manner as was described above in Step 418. A region of interest (ROI) 167 may be selected encompassing the grid pattern 160 for further processing. The quantity of pixels 72 extending linearly along at least one direction of the ROI 167 may be determined and may be divided by the known size of the grid pattern 160 as projected on a planar surface of the article 14 to arrive at an image scale factor. The ROI 167 may then be extracted from the image 70 and thresholded at a reduced intensity level to increase the amount of information in the laser projection of the grid pattern 160 and measurement pattern 100 (e.g., cross hairs 102) in the image 70. A Hough transform may be applied to the ROI 167 such that substantially straight line segment may be identified within the ROI 167.

Referring still to FIG. 13, the endpoints 169 of the four line segments 163 terminating at the hole perimeter 32 may be selected. The four endpoints 169 may facilitate a determination of the hole 30 size using a least squares fit of the endpoints 169. The measured location of the hole center 34 may be determined based on the determined hole 30 diameter. The grid pattern 160 may be projected onto the article 14 such that the intersection of the measurement pattern 100 cross hairs 102 represents the desired or nominal location of the hole center 34. A deviation 110 of the measured location 28 of the hole 30 and the desired location 26 of the hole 30 may be determined based on pixels 72 extending linearly between the measured hole 30 location and the desired or nominal hole center 34 multiplied by the image scale factor.

With regarding to determining an edge distance 108 of the hole 30 from the article edge 20, in FIG. 13, a second region of interest (ROI) 168 may be extracted from the original image 70. The second ROI 168 may encompass a portion of the measurement pattern 100 (e.g., cross hairs 102) oriented along the direction of the edge distance 108. For example, in FIG. 13, the second ROI 168 may have a height generally equivalent to a height (e.g., diameter) of the hole 30 and a width extending along the width of the image 70. Additional image processing may be performed on the second ROI 168 to enhance image analysis for determining the edge distance 108. For example, the second ROI 168 may be subjected to a Sobel filter to emphasize horizontal lines of the image 70 and de-emphasize vertical lines of the image 70. A Hough transform may also be applied to the second ROI 168 to identify lines. The horizontal line segment extending between the hole 30 and the article edge 20 may be identified and selected. This quantity of pixels 72 extending linearly in the horizontal line may be multiplied by the image scale factor to arrive at the edge distance 108 between the hole 30 and the article edge 20.

Figure 15:
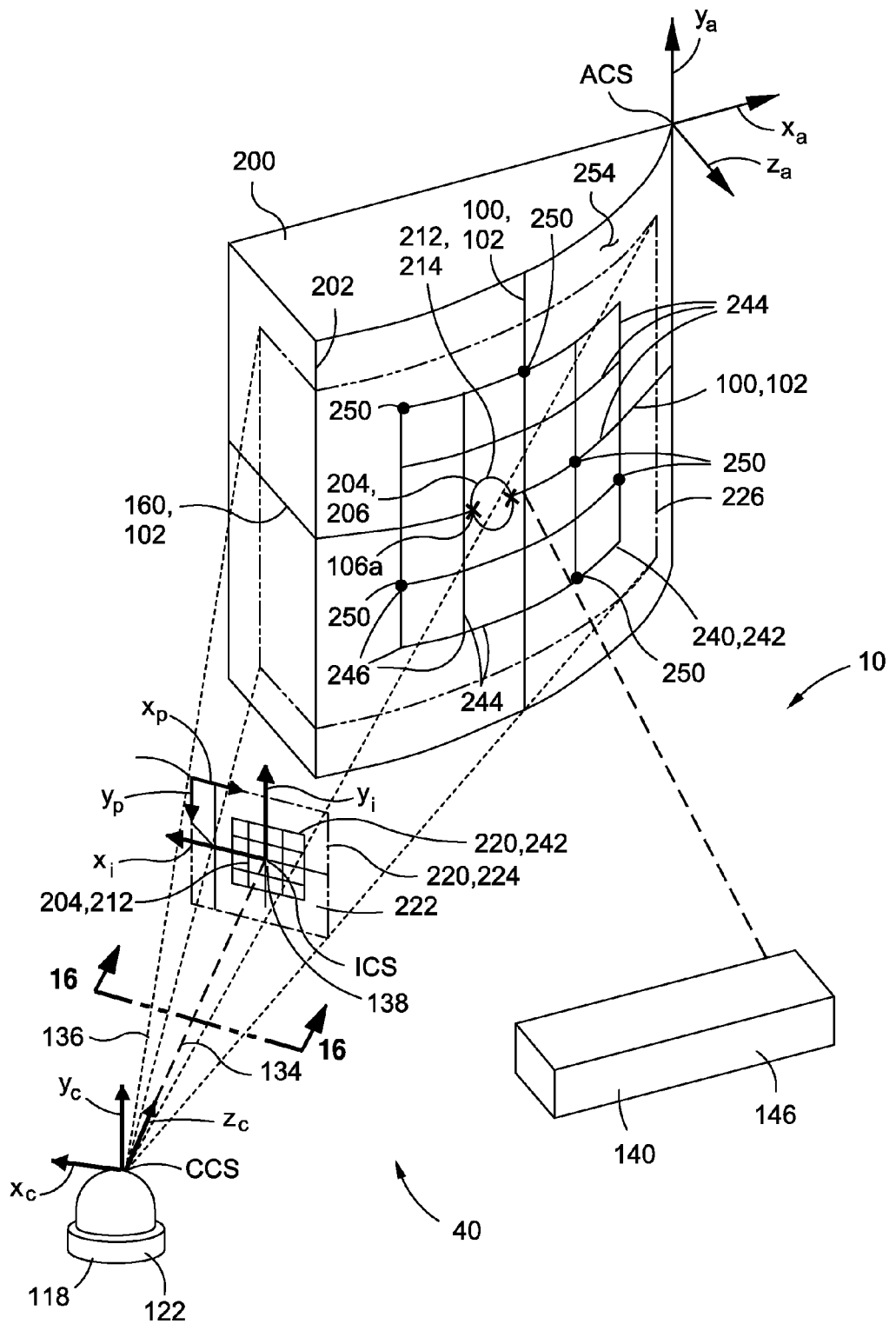
FIG. 15 is a perspective view of an embodiment of the vision system illustrating the projection of the camera calibration template and the measurement pattern onto a non-planar surface of the article.

Referring to FIG. 15, shown is a further embodiment of the vision system for measuring a feature 204 of an article 14 using a camera calibration template 240. Advantageously, the camera calibration template 240 facilitates the measurement of features 204 on a non-planar article surface 254 of the article 200. However, the camera calibration template 240 may be used to measure features on a planar article surface (not shown). In addition, the camera calibration template 240 facilitates the measurement of features 204 in an accurate manner if the camera 122 has significant lens distortion or if the feature 204 is located on an article surface that is a separate surface from the surface onto which the camera calibration template 240 is projected.

As shown in FIG. 15, the camera calibration template 240 may be implemented in a work station 40 environment similar to that which is illustrated in FIG. 1. The camera calibration template 240 may include at least one laser projector 146 (FIG. 4) and at least one camera 122. The laser projector 146 may project the camera calibration template 240 such as the grid pattern 160 having known locations on the article surface 254. The grid pattern 160 may include grid elements 244 intersecting one another at intersection points 246 defining at least six (6) calibration points 250 on the article surface 254. The calibration points 250 may be defined relative to the article coordinate system ACS. The grid pattern 160 may also include corners or other entities that may define the at least six (6) calibration points 250 having known locations on the article surface 254 relative to the article coordinate system ACS. However, the camera calibration template 240 may comprise discrete points (not shown) projected onto the article surface 254. Optionally, a measurement pattern 100 (e.g., cross hairs 102) may also be projected onto the article surface 254. The camera calibration template 240 and/or the measurement pattern 100 may overlap the feature 204 to facilitate measurement of the location and/or size of the feature 204.

FIG. 15 illustrates the camera calibration template 240 and the measurement pattern 100 projected onto a non-planar article surface 254 that is concavely curved. However, the camera calibration template 240 and the measurement pattern 100 may be projected onto a non-planar article surface 254 having any type of curvature including, but not limited to, a convex curvature, or a combination of convex and concave curvatures or other types of contours. The camera 122 has an optical axis 134 intersecting an image plane 224 at a principal point 138 of an image 220 that may be recorded by the camera 122. The camera 122 may record an image 220 bounded by a projected image border 226 which may contain the feature 204, the calibration points 250 and, optionally, the measurement pattern 100. The image 220 may define the image plane 224 and may include a plurality of pixels 222 having pixel coordinates $x_c$, $y_c$ of a pixel coordinate system (PCS). The camera 122 may have a camera coordinate system having camera coordinates $x_c$, $y_c$, $z_c$. The processor 46 may calibrate the camera 122 using the camera calibration template 240. The processor 46 may determine a size and/or a location of the feature 204 on the article surface 254 in article coordinates $x_a$, $y_a$, $z_a$ of an article coordinate system ACS based upon the image 220 and the calibration of the camera 122.

In this regard, the processor 46 (FIG. 1) may determine a relationship between the image 220 and the article surface 254 based on the known three-dimensional (3D) location of the calibration points 250 on the article surface 254 and based on intrinsic parameters and extrinsic parameters of the camera 122. As known in the art, the extrinsic parameters of a camera 122 (FIG. 1) represent the transformation between the camera coordinate system and the article coordinate system ACS and define a location and an orientation of the camera coordinate system relative to the article coordinate system ACS. The extrinsic parameters include translation and rotation values required to co-locate and align the axes of the camera coordinate system with the article coordinate system ACS.

Referring still to FIG. 15, the intrinsic parameters represent a focal length of the camera 122 which may be described as the perspective projection of a point of the image plane 224 onto the article surface 254. The intrinsic parameters may also represent the transformation between coordinates of the image plane 224 to pixel coordinates of the image 220, and geometric distortion of the image 220 due to camera optics such as lens distortion. The intrinsic parameters may provide correspondence of the pixel coordinates of a point (e.g., the calibration points 252 and/or intersection points 246) in the image 220 with corresponding coordinates in the camera coordinate system. The processor 46 (FIG. 1) may define the intersection points 246 (e.g., in pixel coordinate system PCS coordinates) on the image 220 where the camera calibration template 240 and/or measurement pattern 100 intersect the feature edge 206. The processor 46 may then determine the size and/or the location of the feature 204 on the article surface 254 relative to the article coordinate system ACS using the intersection points 246 (FIG. 15) and the relationship that may be calculated between the image 220 and the article surface 254 based on the intrinsic and extrinsic parameters.

Figure 14:
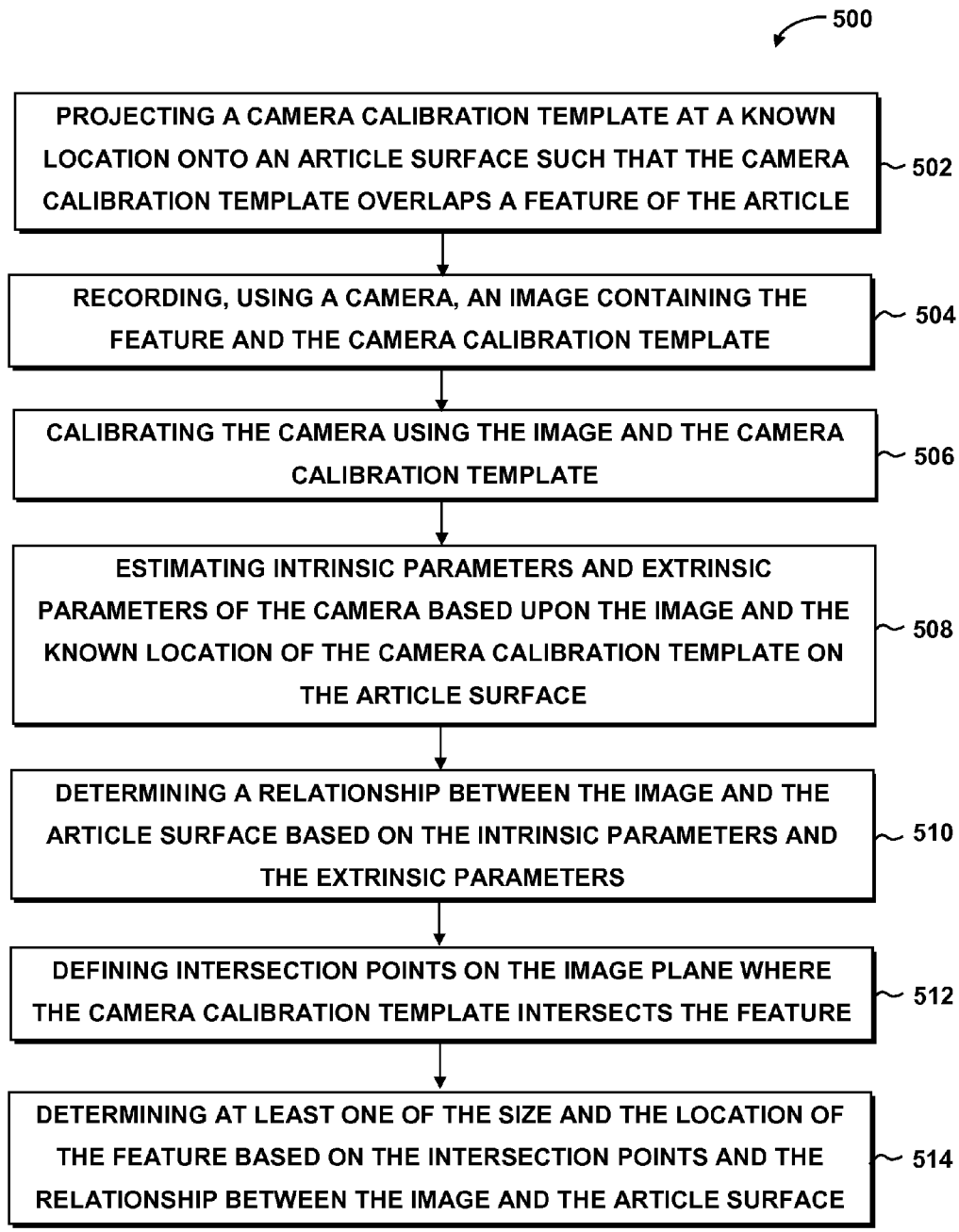
FIG. 14 is an illustration of a flow diagram having one or more operations that may be included in a methodology of measuring one or more features of the article using a camera calibration template projected onto the article.

Referring now to the flow diagram of FIG. 14, shown is a methodology 500 of measuring a feature 204 (FIG. 15) of an article 200 (FIG. 15) using a camera calibration template 240 (FIG. 15). The methodology may facilitate the determination of the size and/or the location of one or more features 204 on the article surface 254 (FIG. 15). The location of the one or more features 204 may be defined relative to the article coordinate system ACS.

Step 502 of the methodology 500 of FIG. 14 may include projecting a camera calibration template 240 (FIG. 15) of known three-dimensional (3D) location on the article surface 254 (FIG. 15). The camera calibration template 240 preferably overlaps the feature 204 as shown in FIG. 15. The calibration template 240 includes at least six (6) calibration points 250 (FIG. 15) having known 3D coordinates on the article surface 254 relative to one another and defined with respect to the article coordinate system ACS to enable the determination of the intrinsic and extrinsic parameters. Although six (6) calibration points 250 are shown projected onto the article surface 254 in FIG. 15, a larger quantity of calibration points 250 may be projected onto the article surface 254 to increase the accuracy of image analysis. Step 502 may comprise projecting the camera calibration template 240 as a grid pattern 242 having grid elements 244 on a non-planar article surface 254 such as the curved surface illustrated in FIG. 15. The intersection of the grid elements 244 may define the at least six (6) calibration points 250.

Figure 16:
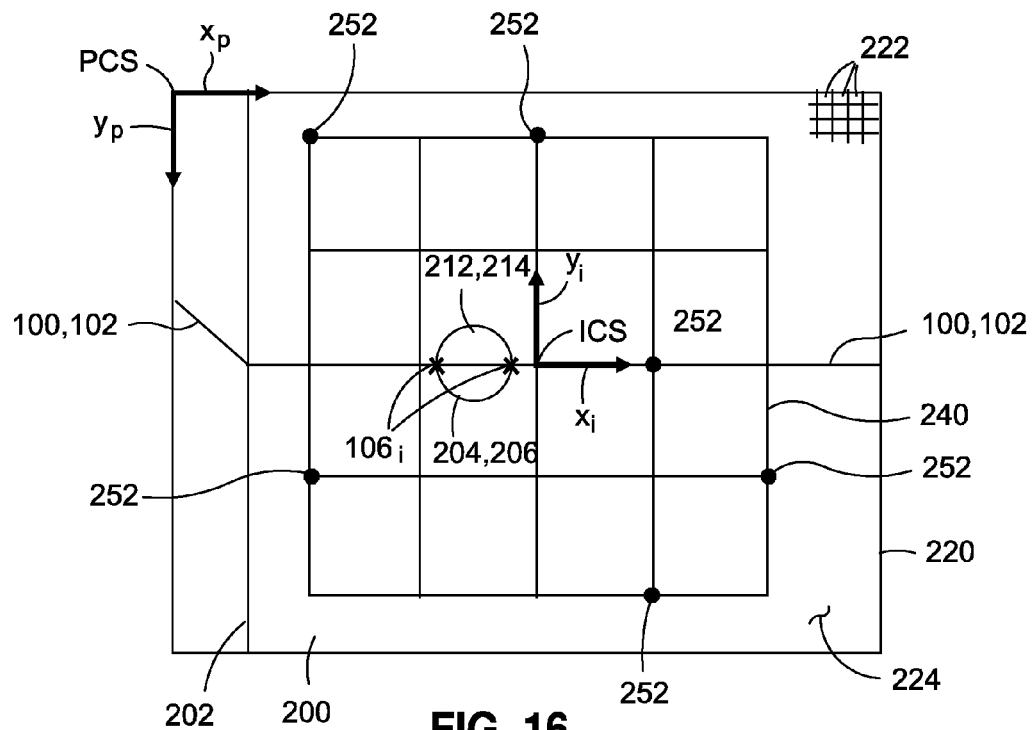
FIG. 16 is a view of the image taken along line 16 of FIG. 15 and illustrating the camera calibration template and the measurement pattern.

Step 504 of the methodology 500 of FIG. 14 may include recording, using one or more cameras 122, an image 220 containing the feature 204 and the camera calibration template 240 as shown in FIG. 15. The image 220 may include the measurement pattern 100 such as the cross hairs 102 which may be projected onto the article surface 254 such that the measurement pattern 100 overlaps the feature 204. In an embodiment, the measurement pattern 100 and the camera calibration template 240 may be integrated or projected onto the article surface 254 as a single projection. The measurement pattern 100 and/or the camera calibration template 240 may overlap the feature 204. Although a single camera 122 is shown in FIG. 16, multiple cameras 122 may be used to record images of each feature 204 in a manner as described above. A preferred image 220 of the feature 204 may be selected based on one or more factors including distance from the camera 122 to the feature 204 or based on other factors discussed above.

Step 506 of the methodology 500 of FIG. 14 may include calibrating the camera 122 (FIG. 1) using the image 220 (FIG. 15) and the projection of the camera calibration template 240 (FIG. 15). More specifically, the calibration of the camera 122 may comprise determining the position of the calibration points 250 (FIG. 15) on the article surface 254 (FIG. 15) in relation to the corresponding calibration points 252 in the image 220.

Step 508 of the methodology 500 of FIG. 14 may comprise calibrating the camera 122 (FIG. 15) by estimating the intrinsic parameters and the extrinsic parameters of the camera 122 based upon the image 220 (FIG. 15) and the known 3D locations of the six (6) calibration points 250 (FIG. 15) on the article surface 254 (FIG. 15). As indicated above, the extrinsic parameters may define a location and an orientation of the camera coordinate system (FIG. 15) relative to the article coordinate system ACS (FIG. 15). The intrinsic parameters may link the pixel coordinates (e.g., via the pixel coordinate system PCS) (FIG. 16) of the points in the image 220 with the coordinates in the camera coordinate system.

Step 510 of the methodology 500 of FIG. 14 may include determining a relationship between the image 220 (e.g., in pixel coordinates) and the article surface 254 (e.g., in article coordinates). The relationship may be determined based on the intrinsic parameters and the extrinsic parameters of the camera 122 described above.

Step 512 of the methodology 500 of FIG. 14 may comprise defining intersection points 106*i* (FIG. 16) on the image plane 224 (FIG. 16) where the camera calibration template 240 (FIG. 16) intersects the feature 204 (FIG. 16). In this regard, the location of the intersection of the measurement pattern 100 with the hole perimeter 214 in the image 220 of FIG. 16 may be described in the context of the location of the same intersection point on the article surface 254 relative to the article coordinate system ACS.

Figure 17:
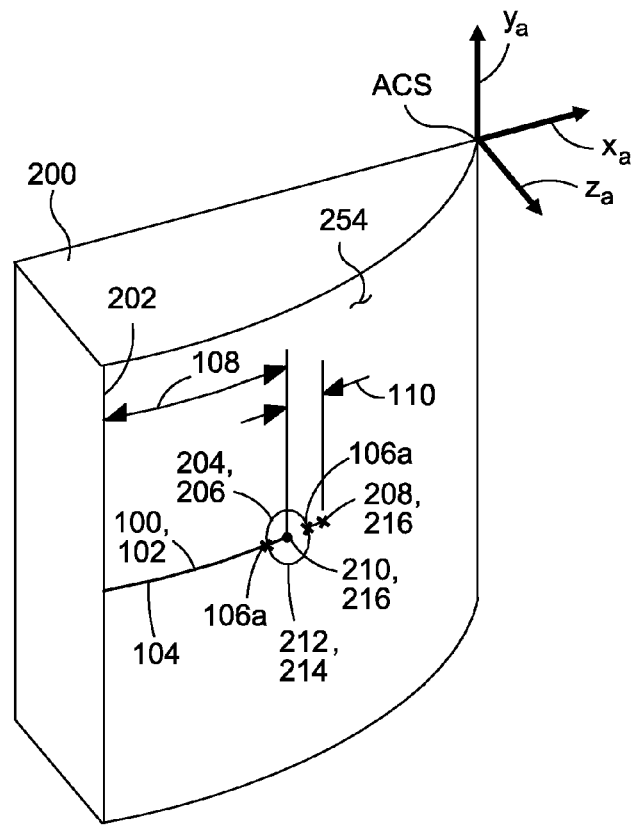
FIG. 17 is a perspective view of the article and illustrating a pattern segment of the measurement pattern extending between an edge of the article and a perimeter of the hole.

Step 514 of the methodology 500 of FIG. 14 may include determining a size and/or a location of the feature 204 (FIG. 17) on the article surface 254 (FIG. 17). The location of the feature 204 on the article surface 254 may be defined in terms of article coordinates based upon the calibration of the camera 122 (FIG. 15) and, more specifically, based on the 3D location of the intersection points 246 on the article surface 254 and the relationship between the image 220 (FIG. 15) and the article surface 254 (FIG. 15). For example, FIG. 17 illustrates the measured location 210 of a hole center 216 and a desired location 208 of the hole center 216 represented by the intersection of the cross hairs 102.

Referring to FIG. 18, the methodology 500 of FIG. 14 may be applied to article 200 where the feature 204 (FIG. 15) is located on a surface that is different than the surface of the camera calibration template 240. As shown in FIG. 18, the feature 204 is associated with a feature surface 256 that is oriented at a different angle than the orientation of the article surface 254 onto which the camera calibration template 240 and the measurement pattern 100 are projected. However, the feature surface 256 may be detached from the article surface 254 onto which the camera calibration template 240 and the measurement pattern 100 are projected. In an embodiment, the feature 204 may comprise a hole 212 formed in a feature surface 256. However, the feature 204 is not limited to a hole 212 formed in the feature surface 256 of the article 200 (FIG. 15) but may comprise any one of a variety of feature configurations including, but not limited to, any feature 204 that is formed in or on the article 200, or which may be applied to, mounted on, attached to, or otherwise associated with the article 200. If the orientation of the feature surface 256 (FIG. 18) is known relative to the article surface 254 (FIG. 15) such as the orientation of a local plane normal 258 (FIG. 18) to the feature surface 256 (FIG. 18), and if the location of the feature surface 256 (e.g., the ACS coordinates of the local plane normal 258) is known relative to the article surface 254 (FIG. 15), then the size and/or the location of the feature 204 (FIG. 15) on the article surface 254 may be determined.

FIG. 19 shows an image 220 of the article 200 of FIG. 18 and illustrating the intersection points 106*i* on the image plane 224 where the measurement pattern 100 intersects the hole perimeter 214. The location of the intersection points 106*i* in the image 220 may be described in the context of the location of the corresponding intersection points 106*a* (FIG. 18) on the article surface 254 relative to the article coordinate system ACS. In this regard, the size and/or location of the feature 204 on the article surface 254 may be defined in terms of article coordinates based upon the calibration of the camera 122 as described above in Steps 508 and 510.

Figure 20:
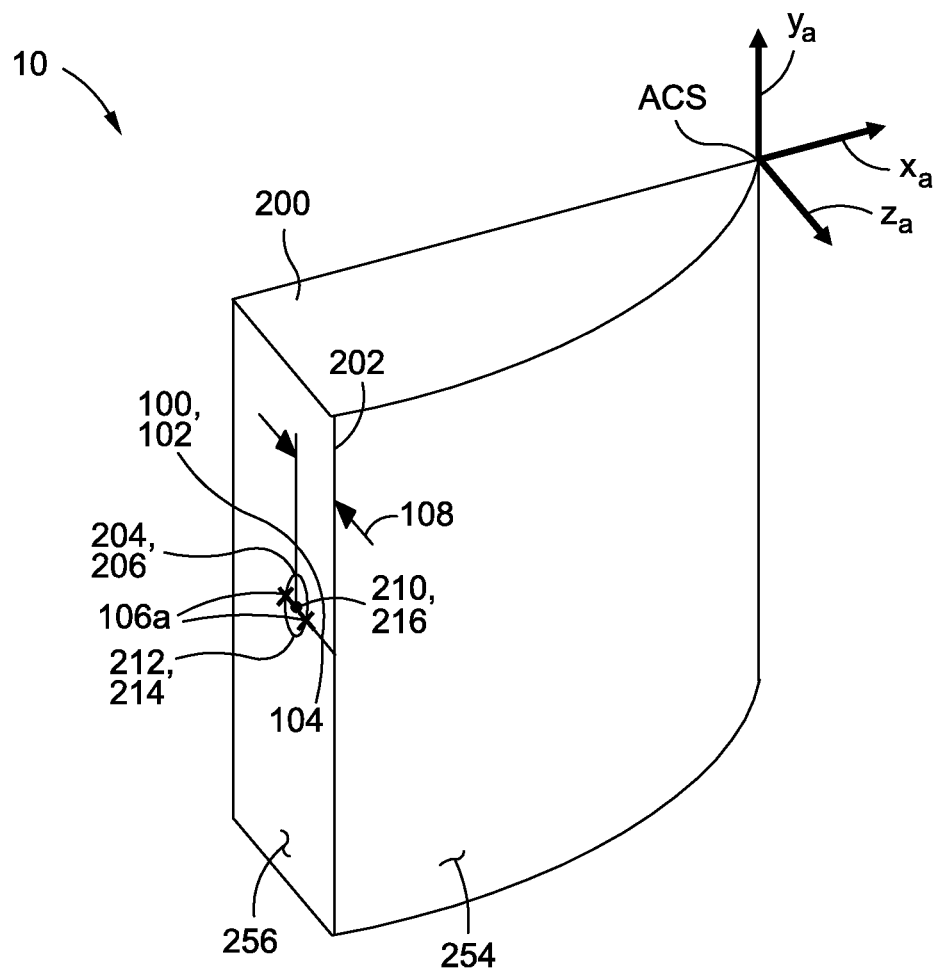
FIG. 20 is a perspective view of the article of FIG. 18 and illustrating a pattern segment representing an edge distance between the article edge and the hole.

FIG. 20 illustrates a portion of the pattern segment 104 extending from the article edge 202 to the hole 212. If a nominal diameter of the hole 212 is known, the measured location 210 of the hole center 216 may be determined relative to the article coordinate system ACS. In this regard, the edge distance 108 in FIG. 20 represents the distance from the article edge 202 to the hole center 216. A hole size may also be determined by projecting the measurement pattern 100 over the hole 212 such that at least three (3) intersection points (not shown) may be formed at the intersections of the measurement pattern 100 with the hole perimeter 214. The size and/or location of features other than holes may also be determined in this same manner.

Advantageously, the above described vision system 10 and methodologies provide a means for non-invasive inspection of an article in a manner that avoids interfering with manufacturing operations and without the need for specialist skills. Furthermore, the vision system 10 may be operated autonomously in a computer-controlled manner in a wide range of environments and under a wide range of lighting conditions for locating features on an article.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of measuring a feature of an article, comprising:
    indexing a laser projector to a plurality of indexing targets including features and/or physical targets;
    projecting a scale template and a measurement pattern onto the article, the scale template including at least one template element of known length, the measurement pattern overlapping the feature;
    recording, using an uncalibrated camera, an image containing the feature, the scale template, and the measurement pattern;
    determining at least one image scale factor of the image based on the known length of the template element; and
    determining at least one of a size and a location of the feature based upon the measurement pattern and the image scale factor.

2. The method of claim 1 wherein the step of determining the image scale factor comprises:
    determining a quantity of pixels extending linearly along the known length of the template element; and
    determining a pixel quantity per unit length of the image based upon the quantity of pixels in the template element.

3. The method of claim 1 wherein the scale template and the measurement pattern are projected onto an article plane, the method further comprising the step of:
    rectifying the image to remove geometric distortion from the image prior to determining the image scale factor.

4. The method of claim 1 wherein the feature has a desired location, the step of determining at least one of a size and a location of the feature comprising:
    projecting the measurement pattern onto the article at the desired location; and
    determining a measured location of the feature relative to the desired location based upon the measurement pattern and the image scale factor.

5. The method of claim 1 wherein the feature comprises a hole having a perimeter, the method further comprising the steps of:
    projecting the measurement pattern onto the article such that the measurement pattern intersects the hole perimeter at intersection points; and
    determining a measured diameter of the hole based upon the image scale factor and the intersection points.

6. The vision system of claim 1 wherein:
    the image is comprised of a plurality of pixels;
    the processor being configured to determine the image scale factor by determining a quantity of the pixels in the template element.

7. A vision system for measuring a feature of an article, comprising:
    a laser projector indexed to a plurality of indexing targets including features and/or physical targets of known location relative to one another and relative to the article;
    the laser projector configured to project a scale template and a measurement pattern onto the article, the scale template including at least one template element of known length, the measurement pattern overlapping the feature;
    an uncalibrated camera configured to record an image containing the feature, the scale template, and the measurement pattern;
    and a processor configured to determine at least one of a size and a location of the feature based upon the measurement pattern, the known length of the template element, and a scale factor of the image.

8. The vision system of claim 1 wherein:
    the laser projector is configured to project the scale template and the measurement pattern onto a substantially planar article surface; and
    the processor being configured to rectify the image to remove geometric distortion from the image prior to determining the image scale factor.

9. The vision system of claim 1 wherein:
    the laser projector is configured to project the measurement pattern onto the article such that the measurement pattern intersects a perimeter of a hole in the article at intersection points;
    the processor being configured to measure a diameter of the hole based upon the image scale factor and the intersection points; and
    the processor being configured to determine a measured location of the hole relative to a desired location of the hole based upon the measurement pattern and the image scale factor.

10. A method of measuring a feature of an article, comprising the steps of: projecting a camera calibration template at a known location onto the article surface relative to the article coordinate system, the camera calibration template including calibration points projected onto the article surface at known three-dimensional locations relative to the article coordinate system;
    recording, using an uncalibrated camera, an image containing the feature and the camera calibration template;
    calibrating the camera based on the image and the known location of the camera calibration template on the article surface by determining the position of the calibration points on the article surface in relation to the corresponding calibration points in the image;
    determining a relationship between the image and the article surface based on the known three-dimensional locations of the calibration points and based on intrinsic and extrinsic parameters of the camera;
    and determining at least one of a size and a location of the feature relative to the article coordinate system based upon the calibration of the camera and the relationship between the image and the article surface.

11. The method of claim 10 wherein the step of projecting the camera calibration template comprises:
    projecting the camera calibration template onto a non-planar article surface.

12. The method of claim 10 wherein the step of projecting calibration points includes:
    projecting at least six calibration points having known locations on the article surface.

13. The method of claim 10 further comprising the steps of:
defining an image plane of the image;
estimating intrinsic parameters and extrinsic parameters of the camera based upon the image and the known location of the camera calibration template on the article surface;
defining intersection points on the image plane where the camera calibration template intersects the feature; and
determining at least one of the size and the location of the feature based on the intersection points and the relationship between the image and the article surface.

14. The method of claim 10 further comprising the steps of:
projecting a measurement pattern onto the article surface such that the measurement pattern overlaps the feature;
recording the image such that the image contains the feature, the camera calibration template, and the measurement pattern; and
determining at least one of the size and the location of the feature based upon the measurement pattern and the calibration of the camera.

15. The method of claim 10 further comprising the steps of:
including the feature with a feature surface that is different than the article surface;
defining a relationship between the feature surface and the article surface; and
determining at least one of the size and the location of the feature based upon the calibration of the camera and the relationship between the feature surface and the article surface.

16. A vision system for measuring a feature of an article, comprising:
a laser projector configured to project a camera calibration template and calibration points onto the article at known three-dimensional locations on the article surface relative to an article coordinate system, the camera calibration template overlapping the feature;
an uncalibrated camera configured to record an image containing the feature and the camera calibration template;
a processor configured to calibrate the camera based on the known location of the camera calibration template on the article surface by determining the position of the calibration points on the article surface in relation to the calibration points m the image;
the processor being configured to determine a relationship between the image and the article surface based on the known three-dimensional locations of the calibration points and based on intrinsic and extrinsic parameters of the camera;
and the processor being configured to determine at least one of a size and a location of the feature relative to the article coordinate system based upon the image and the calibration of the camera and the relationship between the image and the article surface.

17. The vision system of claim 16 wherein:
the camera calibration template includes at least six of the calibration points having known locations on the article surface.

18. The vision system of claim 17 wherein:
the laser projector is configured to project the camera calibration template onto the article surface as a grid pattern; and
the grid pattern having grid elements intersecting one another at the calibration points.

19. The vision system of claim 16 wherein:
the processor is configured to estimate intrinsic parameters and extrinsic parameters of the camera based on the image and the known location of the camera calibration template on the article surface;
the processor being configured to define intersection points on the image where the camera calibration template intersects the feature; and
the processor being configured to determine at least one of the size and the location of the feature based on the intersection points and the relationship between the image and the article surface.

20. The vision system of claim 16 wherein:
the feature is included with a feature surface that is different than the article surface;
the feature surface having a defined relationship with the article surface; and
the processor being configured to determine at least one of the size and the location of the feature based upon the calibration of the camera and the relationship between the feature surface and the article surface.

* * * * *